US012059691B2

(12) United States Patent
Whittington et al.

(10) Patent No.: US 12,059,691 B2
(45) Date of Patent: Aug. 13, 2024

(54) CENTRIFUGE THAT INCLUDES AT LEAST ONE DISCRETE, FLOW INTERFERENCE MEMBER, AND RELATED SYSTEMS AND METHODS

(71) Applicants: POET Research, Inc., Sioux Falls, SD (US); Separator Technology Solutions US Inc, San Leandro, CA (US)

(72) Inventors: Ashley Maxwell Whittington, San Francisco, CA (US); Matthew J. Rindsig, Harrisburg, SD (US); Gregory George Fix, Yankton, SD (US)

(73) Assignees: POET Research, Inc., Sioux Falls, SD (US); Separator Technology Solutions US Inc, San Leandro, CA (US)

( * ) Notice: Subject to any disclaimer, the term of this patent is extended or adjusted under 35 U.S.C. 154(b) by 805 days.

(21) Appl. No.: 17/167,334

(22) Filed: Feb. 4, 2021

(65) Prior Publication Data

US 2021/0245175 A1 Aug. 12, 2021

Related U.S. Application Data

(60) Provisional application No. 62/970,902, filed on Feb. 6, 2020.

(51) Int. Cl.

*B04B 11/06* (2006.01)
*B04B 1/08* (2006.01)
*B04B 11/02* (2006.01)

(52) U.S. Cl.

CPC ................ *B04B 11/06* (2013.01); *B04B 1/08* (2013.01); *B04B 11/02* (2013.01)

(58) Field of Classification Search

CPC ............ B04B 11/06; B04B 1/08; B04B 11/02
See application file for complete search history.

(56) References Cited

U.S. PATENT DOCUMENTS

| | | | | |
|---|---|---|---|---|
| 4,069,969 | A | 1/1978 | Tanaka | |
| 4,784,635 | A | 11/1988 | Bruning et al. | |
| 4,929,227 | A | 5/1990 | Zettier | |
| 5,364,335 | A | 11/1994 | Franzen et al. | |
| 5,676,631 | A * | 10/1997 | Kunz | B04B 1/08 494/71 |
| 7,410,457 | B2 | 8/2008 | Heinrich | |
| 7,537,559 | B2 | 5/2009 | Wieking et al. | |
| 8,734,311 | B2 | 5/2014 | Mackel et al. | |
| 8,778,433 | B2 | 7/2014 | Lee | |

(Continued)

FOREIGN PATENT DOCUMENTS

| | | | |
|---|---|---|---|
| DE | 392129 | C * | 3/1924 |
| DE | 392129 | C | 3/1924 |

OTHER PUBLICATIONS

DE 392129 Description Machine Translation.*

(Continued)

*Primary Examiner* — Walter D. Griffin
*Assistant Examiner* — Shuyi S. Liu
(74) *Attorney, Agent, or Firm* — Kagan Binder, PLLC

(57) ABSTRACT

The present disclosure relates to disrupting a flow of a product stream in a centrifuge to help keep the contents of the stream mixed in a relatively homogenous manner. For example, a centrifuge can include at least one discrete, flow interference member located in a product stream pathway to disrupt the flow of the product stream.

40 Claims, 13 Drawing Sheets

(56) References Cited

U.S. PATENT DOCUMENTS

| | | | | |
|---|---|---|---|---|
| 8,813,973 | B2 | 8/2014 | Lee et al. | |
| 8,986,551 | B2 | 3/2015 | Kohl et al. | |
| 9,290,728 | B2 | 3/2016 | Bootsma | |
| 11,015,156 | B1 | 5/2021 | Kohl et al. | |
| 2014/0221187 | A1 | 8/2014 | Konig et al. | |
| 2017/0333915 | A1* | 11/2017 | Mackel | B04B 11/02 |
| 2018/0147579 | A1* | 5/2018 | Casa | B04B 1/08 |
| 2021/0107014 | A1* | 4/2021 | Hilding | B04B 1/08 |

OTHER PUBLICATIONS

International Search Report and Written Opinion for Corresponding International Application No. PCT/US2021/016578, mailed May 17, 2021 (13 pages).

E-Space English Machine Translation for DE392129C.

"STS 500: High Performance Separator Self-Cleaning Disk-Type Centrifuge," Separator Technology Solutions, Sales Brochure, Version:1. 2, Jun. 2015, (4 pages).

"STS 500-2P: High Performance Clarifier Self-Cleaning Disk-Type Centrifuge," Separator Technology Solutions, Spare Parts Manual, Version 1.1, 2017, (37 pages).

"Flottweg Separation Technology," Web page <https://www.flottweg.com/fileadmin/user_upload/data/pdf-downloads/ Sedicanter-EN.pdf>, 12 pages, Aug. 10, 2016, retrieved from Internet Archive Wayback Machine<https://web.archive.org/web/20160810032610/https://www.flottweg.com/fileadmin/user_upload/data/pdf-downloads/Sedicanter-EN.pdf> on Jul. 12, 2022.

* cited by examiner

CENTRIFUGE THAT INCLUDES AT LEAST ONE DISCRETE, FLOW INTERFERENCE MEMBER, AND RELATED SYSTEMS AND METHODS

RELATED APPLICATIONS

The present nonprovisional patent application claims the benefit of commonly owned provisional Application having Ser. No. 62/970,902, filed on Feb. 6, 2020, wherein the entirety of said provisional application is incorporated herein by reference.

BACKGROUND

The present disclosure relates to centrifuges, and related methods and systems, for separating at least one feed stream into at least two product streams.

There is a continuing need for improved centrifuges, and related methods and systems, for separating at least one feed stream into at least two product streams. For example, there is a continuing need to provide one or more product streams with improved homogeneity, especially product streams that have suspended solids.

SUMMARY

The present disclosure includes embodiments of a centrifuge having a central axis of rotation, wherein the centrifuge includes:

a) a bowl portion including:
  i) at least one feed stream inlet and at least a first product stream outlet and a second product stream outlet;
  ii) a bowl portion having an interior surface that defines an interior space, wherein the at least one feed stream inlet and the at least two product stream outlets are in fluid communication with the interior space;
b) a feed stream pathway in fluid communication with the at least one feed stream inlet and the interior space of the bowl portion; and
c) two or more product stream pathways, wherein the two or more product stream pathways include at least:
  i) a first product stream pathway; and
  ii) a second product stream pathway wherein the second product stream pathway has an inlet in the interior space, wherein the second product stream pathway includes a space between a first radially extending surface and a second radially extending surface, and wherein at least one of the first radially extending surface and the second radially extending surface includes at least one discrete, flow interference member that is located in the second product stream pathway to disrupt the flow of a second product stream, wherein the first product stream pathway is located between the second product stream pathway and the central axis of rotation.

The present disclosure includes embodiments of a method of separating at least one feed stream in a centrifuge into at least a first product stream and a second product stream, wherein the method includes:

a) providing the at least one feed stream to a feed stream inlet of a centrifuge, wherein the centrifuge has a central axis of rotation and a bowl portion having an interior surface that defines an interior space;
b) separating two or more product streams from the at least one feed stream in the interior space of the centrifuge, wherein a first product stream flows in a first product stream pathway of the centrifuge and a second product stream flows into a second product stream pathway adjacent to the interior surface of the bowl portion; and
c) disrupting a flow of the second product stream in the second product stream pathway.

BRIEF DESCRIPTION OF THE DRAWINGS

Note that the same reference characters described herein among the figures refer to the same feature.

DETAILED DESCRIPTION

The present disclosure relates to centrifuges (separators) and related methods of separating a feed stream into at least two product streams. A centrifuge can separate a feed stream into two or more product streams based on at least density differences. In some embodiments, a centrifuge can also separate based on particle size by utilizing screen components, and the like.

Embodiments of the present disclosure can be used with a variety of centrifuges. Non-limiting examples include disk stack centrifuges (e.g., two-phase disk stack centrifuges and three-phase disk stack centrifuges), combination disk stack-decanters, combination disk stack-filtration or disk stack-basket centrifuges. Non-limiting examples of disk stack centrifuges include stacks of flat disks or frustoconical disks. A non-limiting example of a disk stack centrifuge is described in U.S. Pat. No. 4,784,635 (Bruning et al.), wherein the entirety of said patent is incorporated herein by reference. A non-limiting example of a type of centrifuge that can be utilized according to the present disclosure is illustrated in FIGS. 1A and 1B and can be referred to as a two-phase disk-stack type centrifuge.

Figure 1A:
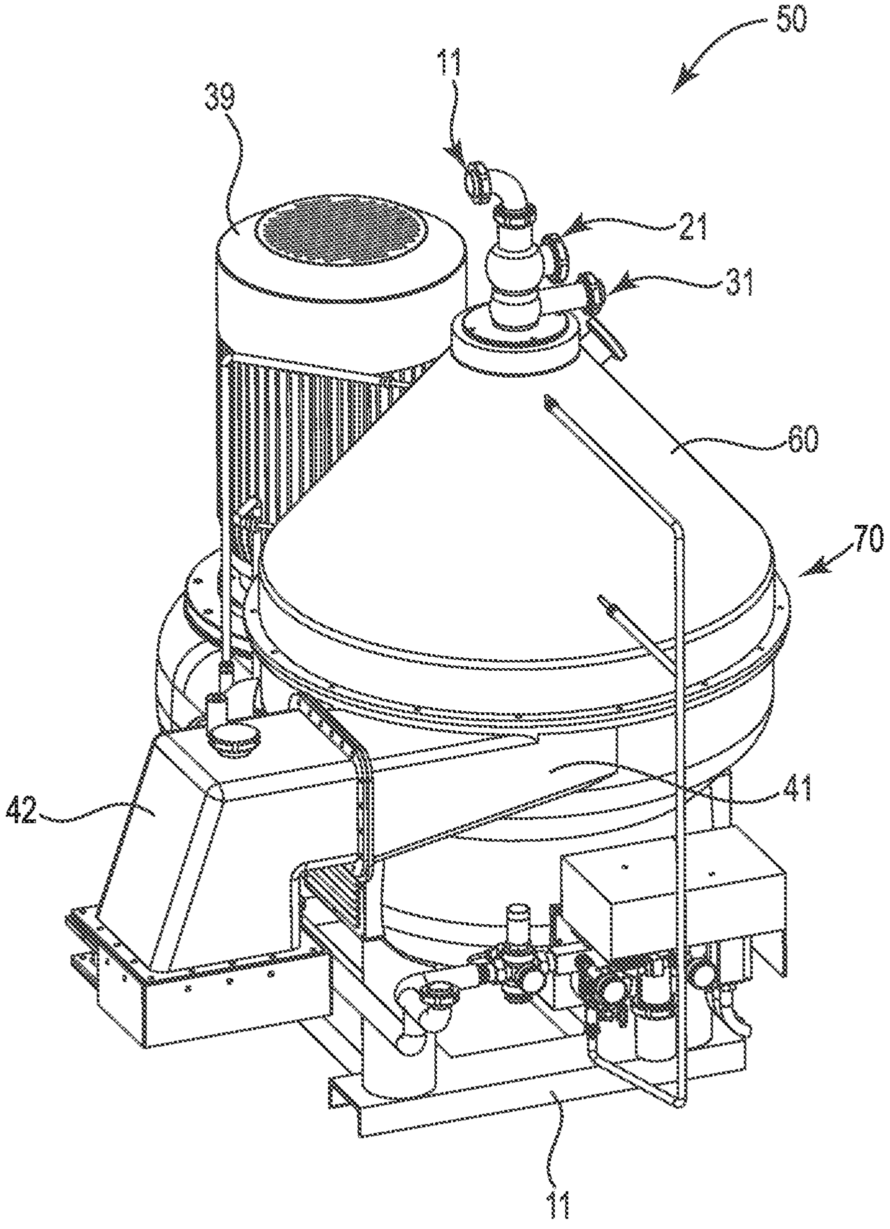
FIG. 1A shows a full assembly of a centrifuge system.

FIG. 1A shows a full assembly of a non-limiting example of a centrifuge system 50 according to the present disclosure. As shown, motor 39 and centrifuge assembly 70 are mounted on frame 11 in a fixed and stationary manner. Centrifuge assembly 70 includes a centrifuge cover 60 that encases/encloses centrifuge 100 (shown in FIG. 1B). Motor 39 is physically coupled to centrifuge 100 to rotate bowl portion 101 (shown in FIG. 1B) about its central, vertical axis 12. Centrifuge cover 60 remains fixed and stationary while bowl portion 101 rotates. Centrifuge assembly 70 also includes a feed stream inlet connection 11, a first product stream outlet connection 21, a second product stream outlet connection 31, solids collector 41 and discharge chute 42, which are discussed below.

Figure 1B:
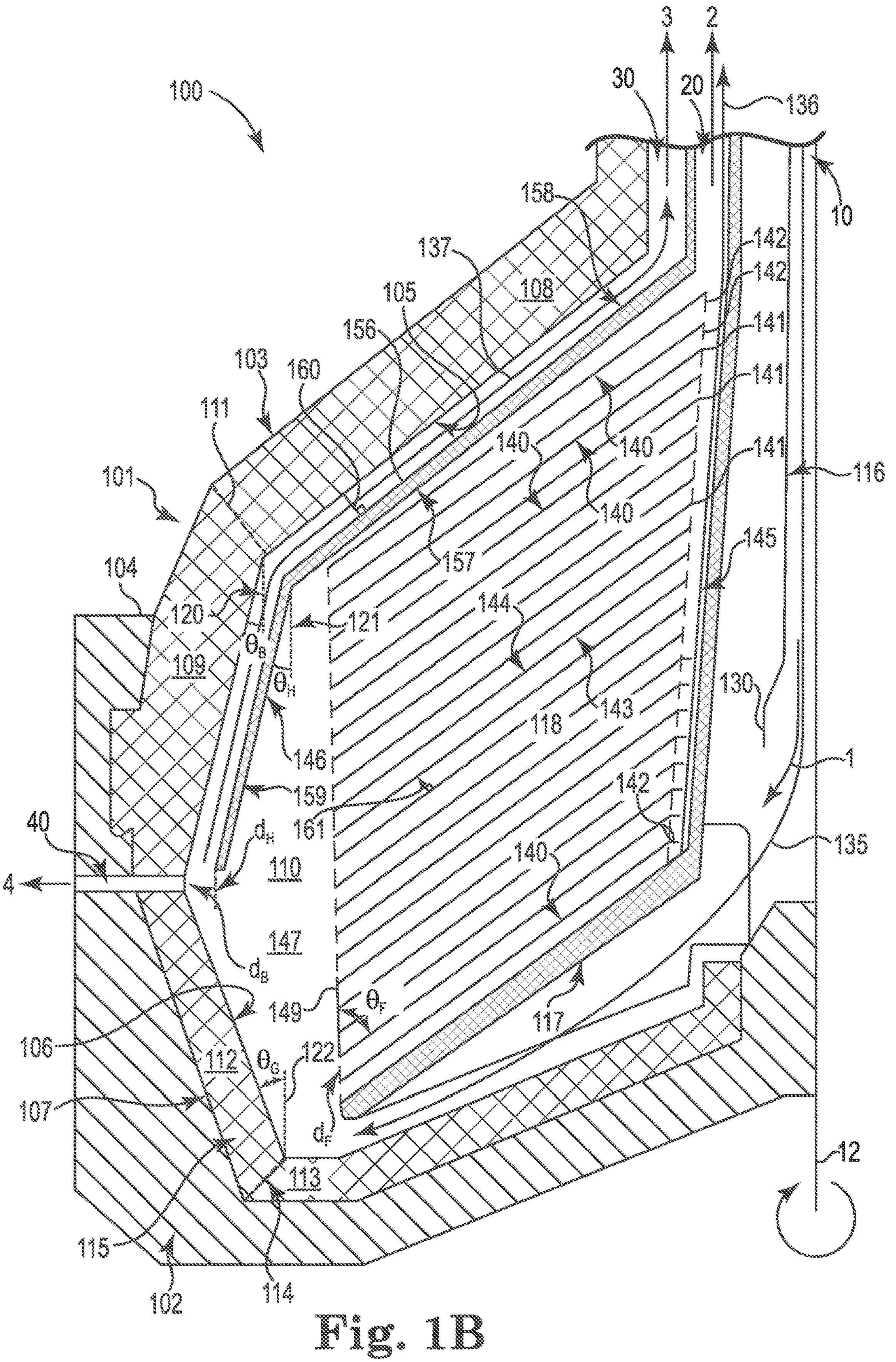
FIG. 1B is a schematic showing a partial, cross-sectional view of centrifuge 100 encased within cover 60 of centrifuge assembly 70 shown in FIG. 1A and that does not include any discrete, flow interference members according to the present disclosure.

FIG. 1B shows a partial, cross-sectional view of centrifuge 100 encased within cover 60 of centrifuge assembly 70 shown in FIG. 1A illustrating half of the centrifuge 100 as defined by its center axis 12.

A wide variety of feed streams can be separated into two or more product streams using a centrifuge according to the present disclosure. Non-limiting examples of sources of feed streams include those produced in the petroleum industry, the agricultural industry (including dairy industry), the biorefinery industry, food and beverage industry (e.g., wine industry, beer industry, etc.) and the like. A feed stream may include a solid component and/or a liquid component. A solid component can include particles having one or more chemical compositions. A solid component may include particles all having the same density or particles having different densities. A solid component may also include particles having substantially the same size or a particle size distribution. A solid component may also include particles all having the same geometry or particles having different geometries. A solid component may also include particles having substantially the same settling velocity or a settling velocity distribution. A liquid component can include one or more chemical compositions, which may have the same or different densities. As such, a feed stream may be separated into two or more product streams, where each product stream has a different profile as compared to the feed stream in terms of one or more of chemical composition, bulk density of stream, particle density, particle size, particle geometry, particle settling velocity, solid component content, and liquid component content.

In a non-limiting illustrative example, feed stream 1 in FIG. 1B is derived from whole stillage after recovering a biochemical (e.g., ethanol) produced by fermenting a mash made out of ground corn. For example, feed stream 1 may be whole stillage or any composition derived from whole stillage such as wet cake, thin stillage; clarified thin stillage; concentrated thin stillage; concentrated, clarified thin stillage; modified thin stillage; oil emulsion; backset; protein (yeast) paste; and the like. In some embodiments, the feed stream 1 can include a liquid component having water, corn oil, protein, acids, minerals and mixtures thereof. In some embodiments, the feed stream 1 can include a solid component having particles having corn starch, corn fiber, and/or protein (e.g., corn protein and/or yeast protein).

A centrifuge according to the present disclosure has a bowl portion. The bowl portion can be a single unitary bowl portion or may include two or more portions that couple together such as a first (upper) portion and second (bottom) portion. In the illustrative example of FIGS. 1A and 1B centrifuge 100 has a bowl portion 101 that includes a bowl bottom 102 coupled to a bowl top 103 in a sealing manner by lock ring 104, where bowl top 103 is separate from bowl bottom 102. As shown, bowl bottom 102 contains a sliding piston 115. As discussed further below, centrifuge 100 can be referred to as an intermittent desludger type centrifuge, where sliding piston 115 intermittently slides downwards within bowl bottom 102 to permit heavy phase material such as concentrated solid particles to be discharged as a discharge stream 4 through discharge passageway 40. Alternatively, bowl portion 101 could have one or more nozzles (not shown) that permit heavy phase material to be continuously discharged. An example of nozzles for discharging solids from a centrifuge is illustrated in U.S. Pat. No. 8,192,342 (8,192,342 (Trager et al.)), wherein the entirety of said patent is incorporated herein by reference. In some embodiments, a bowl portion (e.g., single unitary bowl portion) does not permit a discharge stream from the side of the bowl portion (intermittently or continuously).

A bowl portion includes an interior surface that defines an interior space of the bowl portion, where a feed stream can be separated into two or more product streams. In the illustrative example of FIGS. 1A and 1B, interior space 110 is defined by the interior surface 105 of bowl top 103 and an interior surface 106 of sliding piston 115. Because bowl bottom 102 has sliding piston 115 contained within it, the interior surface 106 corresponds to the surface of sliding piston 115. If centrifuge 100 is a different type of centrifuge that does not include sliding piston 115, then the interior surface 107 of the bowl bottom 102 would correspond to interior surface 106.

The interior surface of a bowl portion can have an inside diameter that gets progressively larger as compared to one end (e.g., the bottom) until a maximum is reached and then gets progressively smaller toward the other end (e.g., the top). The maximum inside diameter of the bowl portion is where the heaviest phase of the feed stream will tend to concentrate when the centrifuge is operating to separate the feed stream. In the illustrative example of FIGS. 1A and 1B, de corresponds to the maximum inside diameter (ID) of bowl portion 101, which can also be the maximum ID of bowl top 103. The bowl top 103 maximum ID can vary over a wide range depending on one or more factors such as the material in the feed stream to be separated and any other components located inside of interior space 110 of bowl portion 101. In some embodiments, $d_B$ is from 150-1,500 mm or even from 250-900 mm.

A wide variety of bowl top 103 configurations can be selected based on one or more factors such as the material in the feed stream to be separated, any other components located inside of interior space 110 of bowl portion 101, and the like. In the illustrative example of FIGS. 1A and 1B, bowl top 103 has a sidewall portion 108 and a sidewall portion 109 that form an integral interface at dotted line 111. As can be seen, each of sidewall portion 108 and sidewall portion 109 have interior surfaces continuous with one another that define the interior surface 105 and that extend radially outwardly relative to axis 12 in a downward direction. As discussed in more detail below, during operation of centrifuge 100 material flows along surface 105 upward and, therefore, radially inward relative to axis 12. In some embodiments, the interior surface 105 of sidewall portion 109 can have an angle $\theta_B$ that is 10 to 60 degrees, or even from 15 to 40 degrees relative to the datum 120, which is parallel to axis 12.

A wide variety of bowl bottom configurations can be selected based on one or more factors such as the material in the feed stream to be separated, how the product streams will be discharged, any other components located inside of interior space 110 of bowl portion 101, and the like. In the illustrative example of FIGS. 1A and 1B, bowl bottom 102 includes sliding piston 115. Sliding piston 115 conforms approximately to the shape of interior surface 107 of bowl bottom 102 for reasons such as functional design, and has a sidewall portion 112 and a bottom wall portion 113 that form an integral interface at dotted line 114. In some embodiments, the interior surface 106 of sidewall portion 112 can have an angle $\theta_G$ that is 10 to 60 degrees, or even from 15 to 40 degrees relative to the datum 122, which is parallel to axis 12. As mentioned above, if centrifuge 100 is a different type of centrifuge that does not include sliding piston 115, then the interior surface 107 of the bowl bottom 102 would correspond to interior surface 106. Accordingly, sidewall portion 112 would be part of bowl bottom 102 and have the angle $\theta_G$.

A centrifuge bowl portion according to the present disclosure can include at least one feed stream inlet and at least a first product stream outlet and a second product stream outlet. Optionally, a centrifuge bowl portion according to the present disclosure can include one or more additional inlets and/or outlets. Each of the inlets and outlets are in fluid communication with the interior space of the bowl portion so that a feed stream can be fed to the interior space of the bowl portion for separation into at least first and second product streams. In the illustrative example of FIGS. 1A and 1B, feed stream 1 can be fed into a feed stream inlet 10 of centrifuge 100 so that it can pass through the interior space 110 and be separated into a first product stream 2 and a second product stream 3. The first product stream 2 can exit centrifuge 100 via a first product stream outlet 20, while the second product stream 3 can exit centrifuge 100 via a second product stream outlet 30. In the illustrative example of FIGS. 1A and 1B, the feed stream inlet, first product stream outlet, and the second product stream outlet are located on the same end (e.g., top or bottom) of centrifuge 100. Alternatively, one or more of the feed stream inlet, first product stream outlet, and the second product stream outlet could be located on an end (e.g., top or bottom) of the centrifuge that is opposite from the end (e.g., top or bottom) where the other stream openings are located. In some embodiments, feed stream 1, first product stream 2, and second product stream 3 can flow on a continuous basis while centrifuge 100 is operating.

In the illustrative example of FIGS. 1A and 1B, feed stream inlet 10 is in fluid communication with and coupled to fixed and stationary inlet connection 11 to permit feed stream 1 to continuously flow into centrifuge 100 while bowl portion 101 rotates. Also, first product stream outlet 20 is in fluid communication with and coupled to fixed and stationary first product stream outlet connection 21, and second product stream outlet 30 is in fluid communication with and coupled to fixed and stationary second product stream outlet connection 31 to permit first product stream 2 and second product stream 3, respectively, to be continuously discharged from centrifuge 100 while bowl portion 101 rotates.

The interior space 110 of bowl portion 101 can have a wide variety of one or more components located therein to help separate a feed stream into two or more product streams.

In the illustrative example of FIGS. 1A and 1B, centrifuge 100 includes a feed stream tube 116 located along central axis 12 of the centrifuge 100 to define at least part of a feed stream flow path 135. As shown, feed stream 1 exits feed stream tube 116 at outlet 130 and flows into distributor 117, which helps distribute and accelerate the feed stream 1 so that it tends to flow radially outward in a uniform manner. The feed stream inlet 10 of centrifuge 100 can correspond to the inlet of feed stream tube 116.

A centrifuge according to the present disclosure can include one or more disks to help separate the feed stream into at least two phases (e.g., a first product stream and a second product stream) based on at least density differences. For example, in the illustrative example of FIGS. 1A and 1B, centrifuge 100 includes a disk stack 118, which, as shown, includes a plurality of disks 140 (shown schematically). For simplicity, the disks are shown schematically. In some embodiments, each disk can be essentially identical to the other disks in terms of outside diameter, shape, thickness, and the like. In some embodiments, at least one or all of the disks can be different from each other in terms of one or more of outside diameter, shape, thickness, and the like. In the illustrative example of FIGS. 1A and 1B, each disk 140 has the outer diameter de and the central opening 142 (in three dimensions) having the inside diameter 141. Each disk 140 radially extends from the inside diameter 141 toward its outside diameter dr. In the illustrative example of FIGS. 1A and 1B, each disk 140 has an approximately frustoconical shape in three-dimensions with a top surface 144 and a bottom surface 143. As can be seen, each disk 140 is adjacent to and spaced apart from at least one other disk 140 in a stacked manner to help separate feed stream into at least two product streams, which is discussed further below with respect to FIGS. 2 and 3.

The disk stack 118 is positioned in the interior space 110 of bowl portion 101 to interact with the feed stream as the feed stream flows out of distributor 117 along a portion of feed stream flow path 135. As can be seen in FIG. 1B, the central opening 142 of each disk 140 surrounds upper section of distributor 117 to define an annulus region 145 that is approximately coaxial with the feed stream tube 116 and axis 12.

In the illustrative example of FIGS. 1A and 1B, since each disk 140 has the outer diameter de the disk stack 118 has outside diameter dr, which can be selected depending on a variety of factors such as the composition of the feed stream 1, the composition of the product streams 2 and 3, and the like. In some embodiments, the outside diameter de can be from 100 to 1,200 mm, or even from 150 to 800 mm. The top surface 144 of each disk 140 forms an angle $\theta_F$ relative to datum 149 which is parallel to axis 12. The angle $\theta_F$ can also be selected depending on a variety of factors such as the composition of the feed stream 1, the composition of the product streams 2 and 3, and the like. In some embodiments, angle $\theta_F$ can be from 30 to 55 degrees, or even from 35 to 45 degrees.

A disk 140 (as shown in FIG. 1B) can include a first region that extends radially inwardly from outer diameter de to inner diameter 141 relative to the central axis 12, having a gap 161, and at an angle $\theta_F$ such that the outer surface of first region generally follows the shape of the interior surface that will be opposite to the outer surface of disk 140 when disk 140 is positioned in a centrifuge bowl portion. Gap 161 can be maintained by including one or more spacers between a top surface 144 of one disk 140 and the bottom surface that is opposite to top surface 144 (e.g., bottom surface 143 of an overlying disk 140 or the bottom surface 157 of separating disk 146).

In some embodiments, a centrifuge according to the present disclosure can include a separating disk. As used herein, a "separating disk" is different from a disk stack (e.g., disk stack 118) or a disk (e.g., disk 140) within a disk stack 118. A separating disk can help define and guide at least a portion of a second product stream pathway for second product stream 3 that has been separated from the feed stream 1 in disk stack 118. As used herein, a separating disk is not intended to separate a stream into two or more streams like disk stack 118 does to feed stream 1. A non-limiting example of a separating disk is shown in FIG. 1B as separating disk 146, which is positioned between an outermost disk 140 at an end (e.g., upper end) of disk stack 118 and the interior surface 105 of the bowl top 103.

In the illustrative example of FIGS. 1A and 1B, separating disk 146 is depicted as substantially conforming to the shape of the interior surface 105 of bowl top 103 while having a gap between the separating disk 146 and bowl top 103 to form a product stream pathway. For example, as mentioned, bowl top 103 has a first sidewall portion 108. As can be seen, separating disk 146 has a region 158 having a surface 156 that extends radially outward relative to axis 12 and generally follows the shape of (is parallel to) the interior surface 105 of the first sidewall portion 108. Likewise, separating disk 146 has a region 159 that generally follows the shape of (is parallel to) the interior surface 105 of the second sidewall portion 109 of bowl top 103. This relationship among separating disk 146 and the part of the centrifuge 100 that it is positioned next to helps define at least a portion of the second product stream pathway 137 for second product stream 3. The gap or perpendicular distance 160 between the interior surface 105 of the bowl top 103 and the separating disk 146 can be selected as desired. In some embodiments, perpendicular distance 160 is equal to or greater than the shortest perpendicular distance 161 between a top surface 144 of one disk 140 and the bottom surface 143 of an adjacent disk 140.

In the illustrative example of FIGS. 1A and 1B, the separating disk 146 has a maximum outside diameter $d_H$, which can be selected depending on a variety of factors such as the distance to other adjacent surfaces (e.g., interior surface 105 and/or disk stack 118), and the like. In some embodiments, the outside diameter $d_H$ can be from 150 to 1,500 mm, or even from 250 to 900 mm. In some embodiments, outside diameter da is 99% or less of $d_B$. while at the same time the outside diameter $d_H$ is 85% or greater of dr. For example, $d_H$ may be equal to or less than $d_F$ where the separation disk has only region 158 and no region 159. In some embodiments, outside diameter $d_H$ is 98.5% or less of $d_B$, while at the same time the outside diameter $d_H$ is 100% or greater of $d_F$. The bottom surface of region 159 of separating disk 146 forms an angle $\theta_H$ relative to datum 121 which is parallel to axis 12. Angle $\theta_H$ can be selected depending on a variety of factors such as the composition of the feed stream 1, the composition of the product streams 2 and 3, and the like. In some embodiments, angle $\theta_H$ can be from 10 to 60 degrees, or even from to 40 degrees.

Figure 5A:
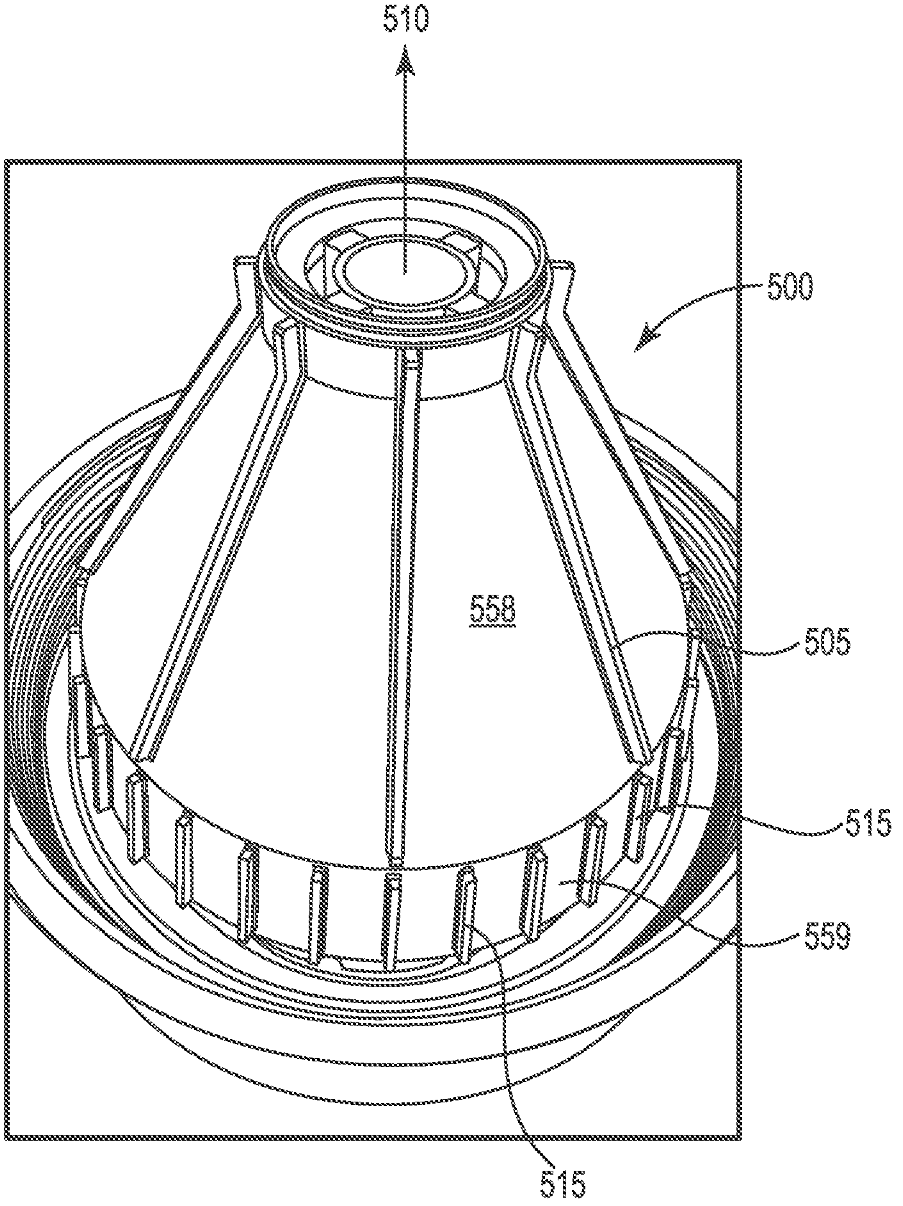
Fig. 5A PRIOR ART
FIG. 5A illustrates an example of a separating disk having a plurality of structural spacer ribs and no discrete, flow interference members according to the present disclosure.

In some embodiments, a centrifuge according to the present disclosure can also include one or more structural spacer ribs located between adjacent disks 140 and/or between the outer surface 156 of separating disk 146 and the surface opposite to surface 156 (e.g., surface 105). As used herein, "structural spacer ribs" provide structural support to help maintain space (a gap) between opposing surfaces, especially while a centrifuge is operating at high G-forces that are encountered as a centrifuge is rotating at high rpms to separate a feed stream 1. While structural spacer ribs may divide a space into regions such as fluid flow pathways, they are intended to function as structural support to maintain a gap/space for fluid to flow between opposing surfaces and are not intended to interrupt flow to a significant degree. For illustrations purposes, FIG. 5A shows a non-limiting example of a separating disk 500 that includes a first region 558 that extends radially outwardly relative to the central axis 510 of separating disk 500 and at an angle such that the outer surface of first region 558 generally follows the shape of the interior surface that will be opposite (e.g., the interior surface of a bowl top of a centrifuge bowl portion) to the outer surface of first region 558 when the separating disk 500 is positioned in a centrifuge bowl portion. Likewise, separating disk 500 has a second region 559 that extends radially outwardly relative to the central axis 510 of separating disk 500 and at an angle such that the outer surface of second region 559 generally follows the shape of the interior surface that will be opposite to the outer surface of second region 559 when the separating disk 500 is positioned in a centrifuge. As shown, the outer surface of first region 558 extends at an angle that is different than the angle at which the outer surface of second region 559 extends.

As shown in FIG. 5A, the first region 558 has a plurality of structural spacer ribs 505 that extend continuously along the outside surface of first region 558 from end to end. Alternatively, one or more structural spacer ribs could extend discontinuously along the outside surface of first region 558 so long as they provide sufficient structural stability and support to maintain a space for fluid to flow between opposing surfaces and do not interrupt flow to a significant degree as described above. As can be seen, the sidewalls of each structural spacer rib are parallel to a plane that intersects the central axis 510 of the separating disk 500, which helps to avoid interrupting flow of fluid through each space/region between adjacent structural spacer ribs 505.

In some embodiments, each of the structural spacer ribs 505 will be predominantly in contact with the interior surface that opposes (e.g., the interior surface of a bowl top of a centrifuge bowl portion) the outer surface of first region 558 when the separating disk 500 is positioned in a centrifuge. For example, referring to FIG. 1B, structural spacer ribs could be attached to the outer surface 156 of region 158 and/or the interior surface 105 of the sidewall portion 108 of the bowl top 103. When the separating disk 146 is mounted in the centrifuge 100, structural spacer ribs attached to outer surface 156 of region 158 may contact the interior surface 105 of the sidewall portion 108 of the bowl top 103 at least while centrifuge 100 is operating at high G-forces to provide stability and structural support to help maintain space (a gap) 160 between outer surface 156 of region 158 and interior surface 105 of the sidewall portion 108 of the bowl top 103 and maintain second product stream pathway 137 for second product stream 3. Structural spacer ribs attached to outer surface 156 of region 158 may also contact the interior surface 105 of the sidewall portion 108 of the bowl top 103 when centrifuge 100 is stationary and not rotating. Likewise, when the separating disk 146 is mounted in the centrifuge 100, structural spacer ribs attached to interior surface 105 of the sidewall portion 108 of the bowl top 103 may contact the outer surface 156 of region 158 at least while centrifuge 100 is operating at high G-forces to provide structural stability and support to help maintain space (a gap) 160 between outer surface 156 of region 158 and interior surface 105 of the sidewall portion 108 of the bowl top 103 and maintain second product stream pathway 137 for second product stream 3. Structural spacer ribs attached to interior surface 105 of the sidewall portion 108 of the bowl top 103 may also contact outer surface 156 of region 158 when centrifuge 100 is stationary and not rotating. As shown in FIG. 5A, the second region 559 also has a plurality of structural spacer ribs 515 that extend continuously along the outside surface of second region 559 from end to end. Alternatively, one or more structural spacer ribs could extend discontinuously along the outside surface of second region 559 so long as they provide sufficient structural stability and support to maintain a space for fluid to flow between opposing surfaces and do not interrupt flow to a significant degree. As can be seen, the sidewalls of each structural spacer rib is parallel to a plane that intersects the central axis 510 of the separating disk 500, which generally helps to avoid interrupting flow of fluid through each space/region between adjacent structural spacer ribs.

In some embodiments, each of the structural spacer ribs 515 will be in contact with the interior surface that will be adjacent to the outer surface of second region 559 when the separating disk 500 is positioned in a centrifuge. For example, referring to FIG. 1B, structural spacer ribs could be attached to outer surface 156 of region 159 and/or the interior surface 105 of the sidewall portion 109 of the bowl top 103. When the separating disk 146 is mounted in the centrifuge 100, structural spacer ribs attached to outer surface 156 of region 159 may contact the interior surface 105 of the sidewall portion 109 of the bowl top 103 at least while centrifuge 100 is operating at high G-forces to provide structural stability and support to help maintain space (a gap) between outer surface 156 of region 159 and interior surface 105 of the sidewall portion 109 of the bowl top 103 and maintain second product stream pathway 137 for second product stream 3. Structural spacer ribs attached to outer surface 156 of region 159 may also contact the interior surface 105 of the sidewall portion 109 of the bowl top 103 when centrifuge 100 is stationary and not rotating. Likewise, when the separating disk 146 is mounted in the centrifuge 100, structural spacer ribs attached to interior surface 105 of the sidewall portion 109 of the bowl top 103 may contact the outer surface 156 of region 159 at least while centrifuge 100 is operating at high G-forces to provide structural stability and support to help maintain space (a gap) 160 between outer surface 156 of region 159 and interior surface 105 of the sidewall portion 108 of the bowl top 103 and maintain second product stream pathway 137 for second product stream 3. Structural spacer ribs attached to interior surface 105 of the sidewall portion 109 of the bowl top 103 may also contact outer surface 156 of region 159 when centrifuge 100 is stationary and not rotating In some embodiments, as shown in FIG. 5A, each structural spacer rib 505 in first region 558 aligns with (shares a common bisecting plane with) a corresponding structural spacer rib 515 in second region 559. In some embodiments, second region 559 has more structural spacer ribs 505 than first region 558. For example, as shown in FIG. 5A, second region 559 includes four structural spacer ribs 505 for each structural spacer rib 505 in first region 558.

Figure 5B:
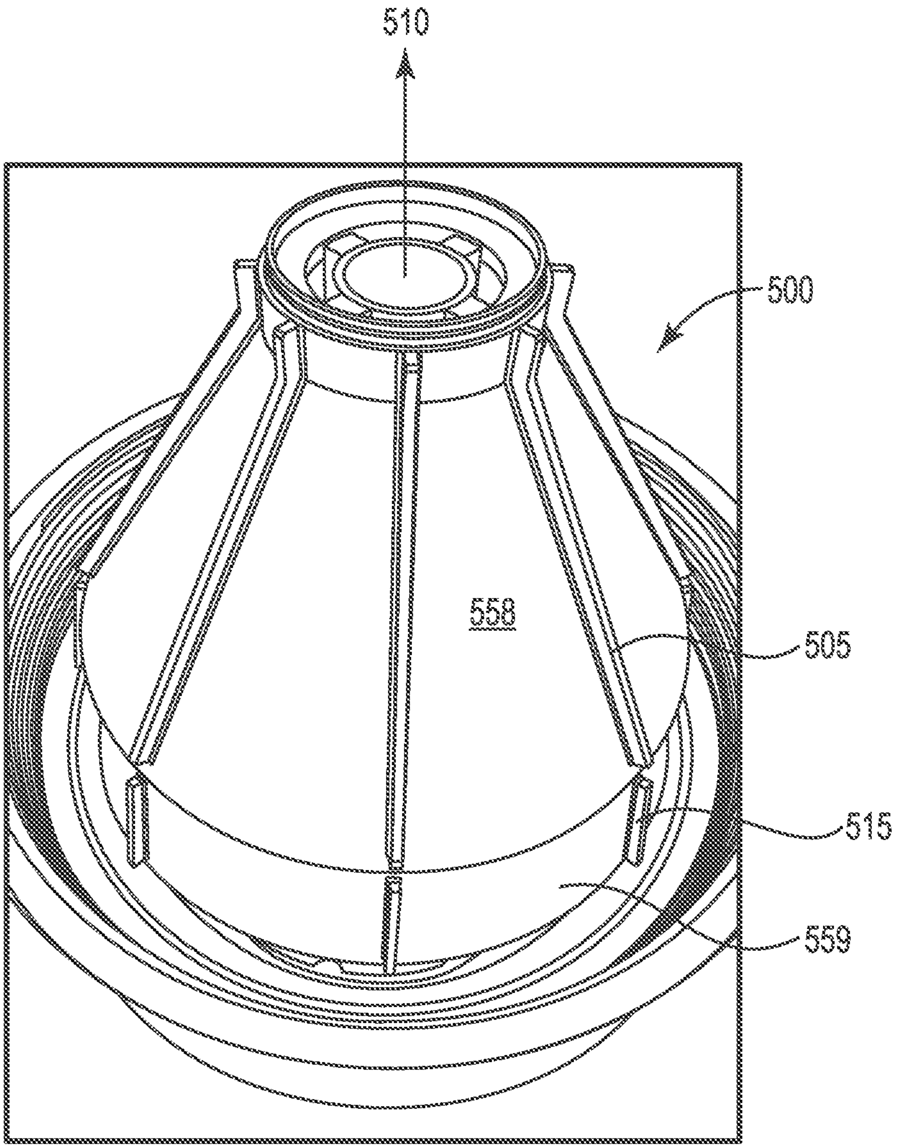
Fig. 5B PRIOR ART
FIG. 5B illustrates another example of a separating disk having a plurality of structural spacer ribs and no discrete, flow interference members according to the present disclosure.

FIG. 5B is similar to FIG. 5A, but includes fewer structural spacer ribs in second region 559.

A centrifuge, including one or more of the components described herein, can be made out of a wide variety of materials such various grades of stainless steel, and the like.

A centrifuge according to the present disclosure can be rotated about its central axis of rotation, generally via a rotor (not shown) driven by a motor 39, and within a wide range of revolutions per minute (rpms) to help separate a feed stream into at least two product streams. For example, the axis of rotation can be horizontal, vertical, or diagonal. As shown in FIG. 1B, centrifuge 100 (including bowl portion 101, disk stack 118, separating disk 146, distributor 117 and feed tube rotate together) rotates about axis 12 while at the same time, as shown in FIG. 1A, centrifuge cover 60, feed stream inlet connection 11, first product stream outlet connection 21, second product stream outlet connection 31, solids collector 41 and discharge chute 42 remain fixed and stationary. To help separate feed stream 1 into at least two product streams, a centrifuge according to the present disclosure can be operated at an rpm or range of rpms selected to provide a desirable G-Force at one or more locations within the interior space 110 of bowl portion 101. As used herein, "G-Force" (or "RCF" (relative centrifugal force)) refers to the amount of acceleration or force exerted on material in a centrifuge. G-Force is a function of the rotational speed and the radius of the rotation. G-Force is expressed in multiples of the standard acceleration due to the Earth's gravitational field (times gravity or×g). In some embodiments, centrifuge bowl portion 101 has a G-Force at de in the range from 3,000 to 15,000×g, or even from 5,000 to 12,500×g. In some embodiments, centrifuge 100 has a G-Force at $d_H$ in the range from 3,000 to 15,000×g, or even from 5,000 to 12,500×g. In some embodiments, centrifuge 100 has a G-Force at de in the range from 1,500 to 10,000×g, or even from 3,000 to 8,500×g.

A centrifuge can separate a feed stream into at least a first product stream and second product stream by having a feed stream flow through a feed stream pathway into the interior space of the bowl portion so that the feed stream can be separated into a first product stream and a second product stream. The first product stream can be discharged (e.g., continuously) from the centrifuge by flowing through a first product stream pathway and the second product stream can be discharged (e.g., continuously) from the centrifuge by flowing through a second product stream pathway.

Figure 3:
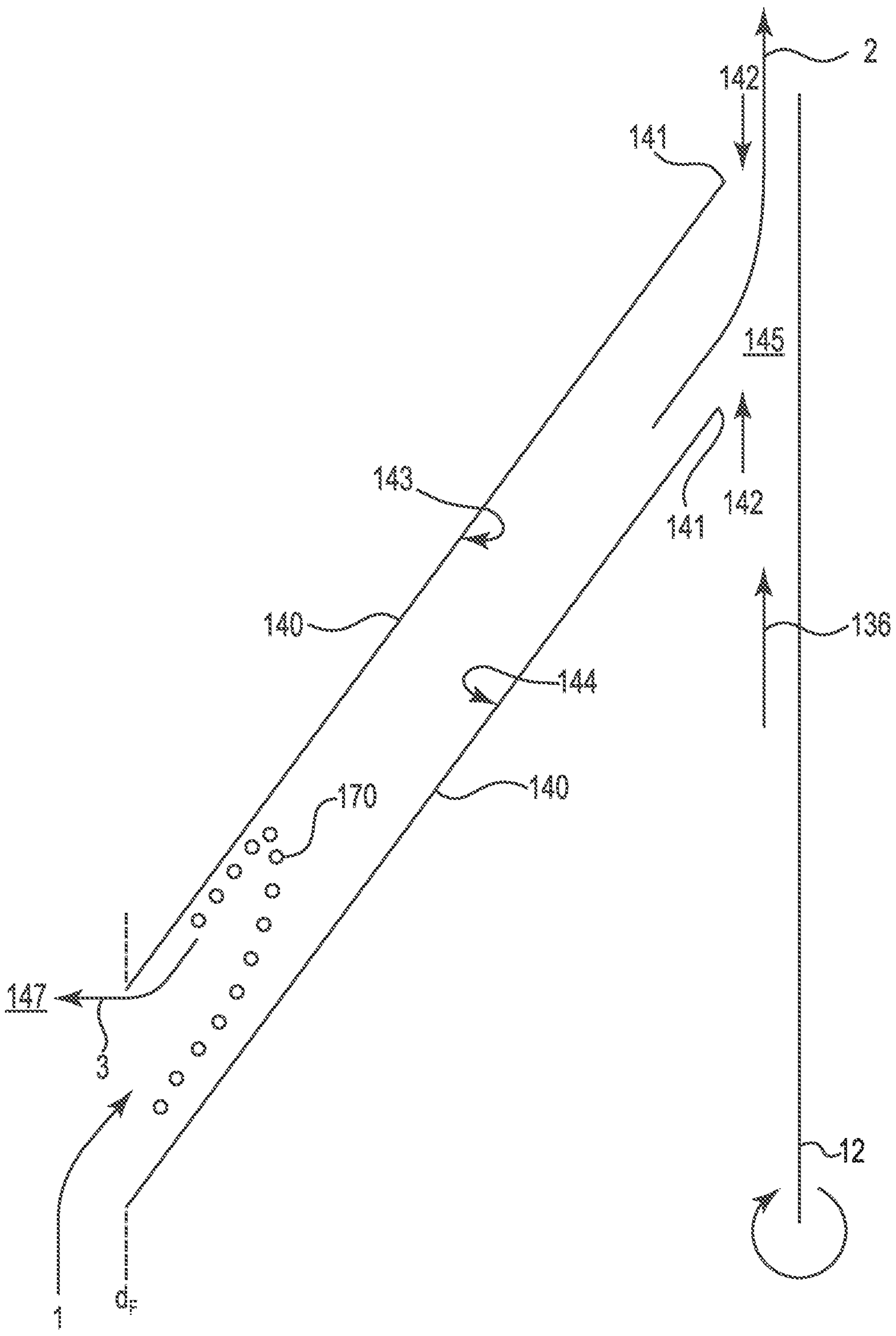
FIG. 3 is a schematic illustrating primary phase separation of solids from liquid between two disks in the disk stack of the centrifuge shown in FIG. 1B.

With respect to centrifuge 100, feed stream flow path 135 is in fluid communication with the at least one feed stream inlet 10 and the interior space 110 of the bowl portion 101. FIG. 3 is a schematic illustration showing flow between two disks 140 in the disk stack of the centrifuge shown in FIG. 1B. The surrounding structures such as the bowl, distributor, and feed stream tube are omitted for simplicity. FIG. 3 illustrates how the feed stream 1 can interact with disks 140 in the disk stack 118 to help separate the feed stream 1 into a first product stream 2 and a second product stream 3 while the feed stream 1 is exposed to a sufficient G-force and exposure time. For illustration purposes, feed stream 1 is derived from stillage that includes solid particles and liquid.

As the feed stream 1 flows into space between two disks 140, centrifugal force causes solid particles 170 to separate ("primary separation" to form two product streams) from the feed stream 1 and flow into solids holding space 147 to form a second product stream 3 of concentrated solids while liquid tends to continue to flow in the space between adjacent disks 140 and in a direction from outside diameter de along radially extending surfaces 144 and 143 and toward the inside diameter 141 to form first product stream 2 and flow into annulus region 145, which is part of the first product stream pathway 136. The second product stream 3 is a relatively heavy phase as compared to first product stream 2, which is a light phase of clarified liquid.

Figure 2:
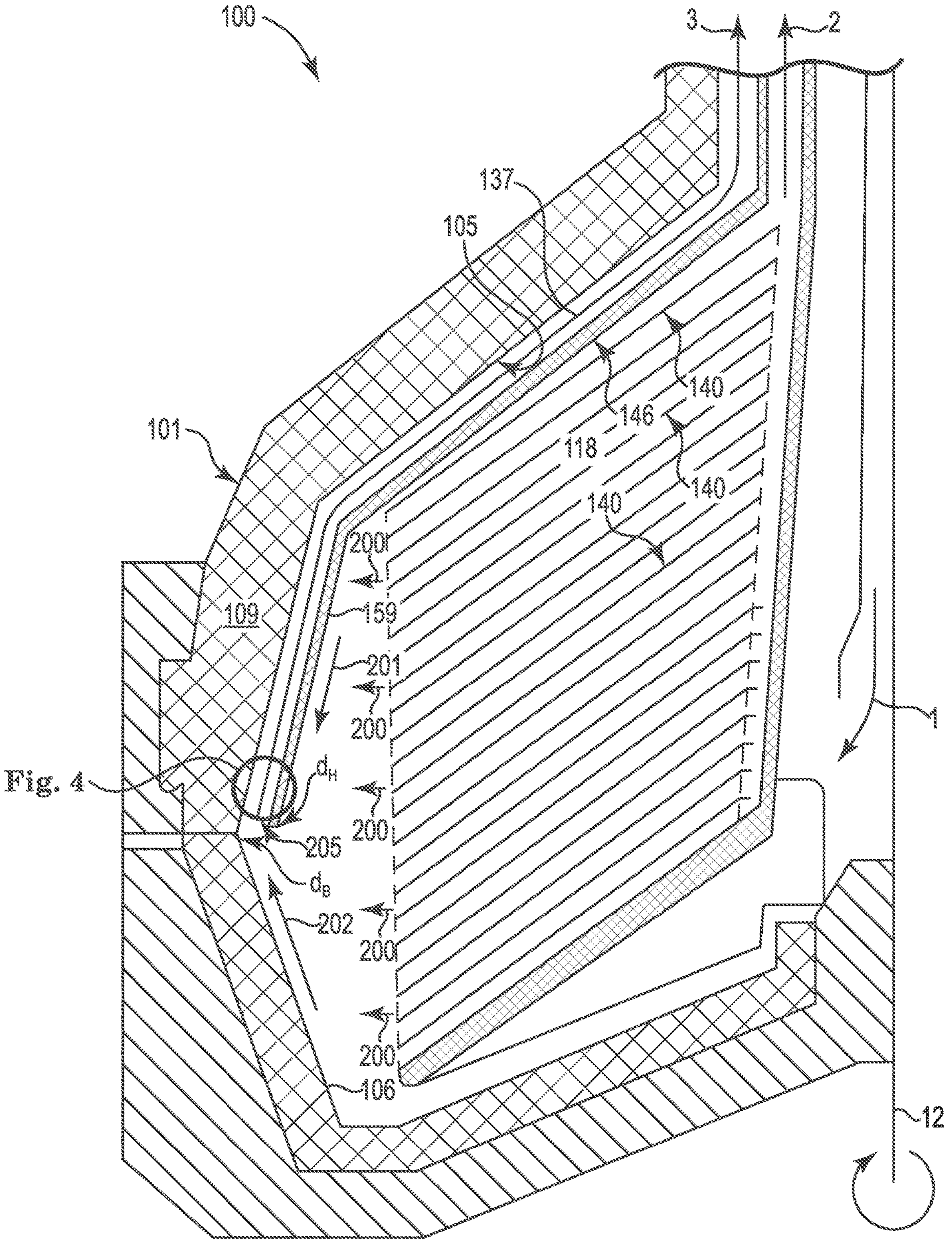
FIG. 2 is a schematic showing a solids/heavy phase flow path in the centrifuge shown in FIG. 1B.

Referring to FIG. 2, the solids that are separated from liquid tend to flow outward from central axis of rotation 12 upon exiting the disk stack 118 as indicated by flow paths at arrows 200 due to centrifugal force. Solids that encounter the inside surface of region 159 of separating disk 146 tend to flow downward as indicated by a flow path at arrow 201 and toward the maximum inside diameter de of bowl portion 101. Similarly, solids that encounter the interior surface 106 tend to flow upward as indicated by a flow path at arrow 202 and toward the maximum inside diameter de of bowl portion 101. Solids that accumulate near inside diameter de and/or de tend to flow into opening 205 between the end of separating disk 146 and the interior surface 105 of sidewall portion 109, which is part of the second product stream pathway 137. As mentioned, centrifuge 100 is a non-limiting illustration of such a centrifuge according to the present disclosure and could have a wide variety of configurations to define opening 205. For example, separating disk 146 could have a shorter region 159, a longer region 159, or even no region 159. In some embodiments, for example where separating disk 146 has no region 159, the outside diameter $d_H$ may be greater than, the same as, or less than dr. As yet another example, a centrifuge according to the present disclosure could have no separating disk 146 such that opening 205 is defined by the gap between the end of uppermost disk 140 in disk stack 118 and the interior surface 105.

Optionally, a centrifuge could include one or more additional product stream pathways such as in a 3-phase disk stack centrifuge. In some embodiments, the first product stream is a light phase liquid stream; the second product stream is a heavy phase that includes most of the solid particles from the feed stream; and the third product stream is a heavy phase liquid stream. A non-limiting example of a feed stream that can be processed in a three-phase centrifuge according to the present disclosure is a stillage stream (e.g., thin stillage), where the first product stream is a light phase liquid stream that includes most of the oil from the stillage feed stream, the second product stream is a heavy phase solid stream that includes most of the solid particles from the stillage feed stream, and the third product stream includes most of the water from the stillage feed stream. An example of separating a stillage stream into three phases is reported in U.S. Pat. No. 9,290,728 (Bootsma), wherein the entirety of said patent is incorporated herein by reference.

Figure 4:
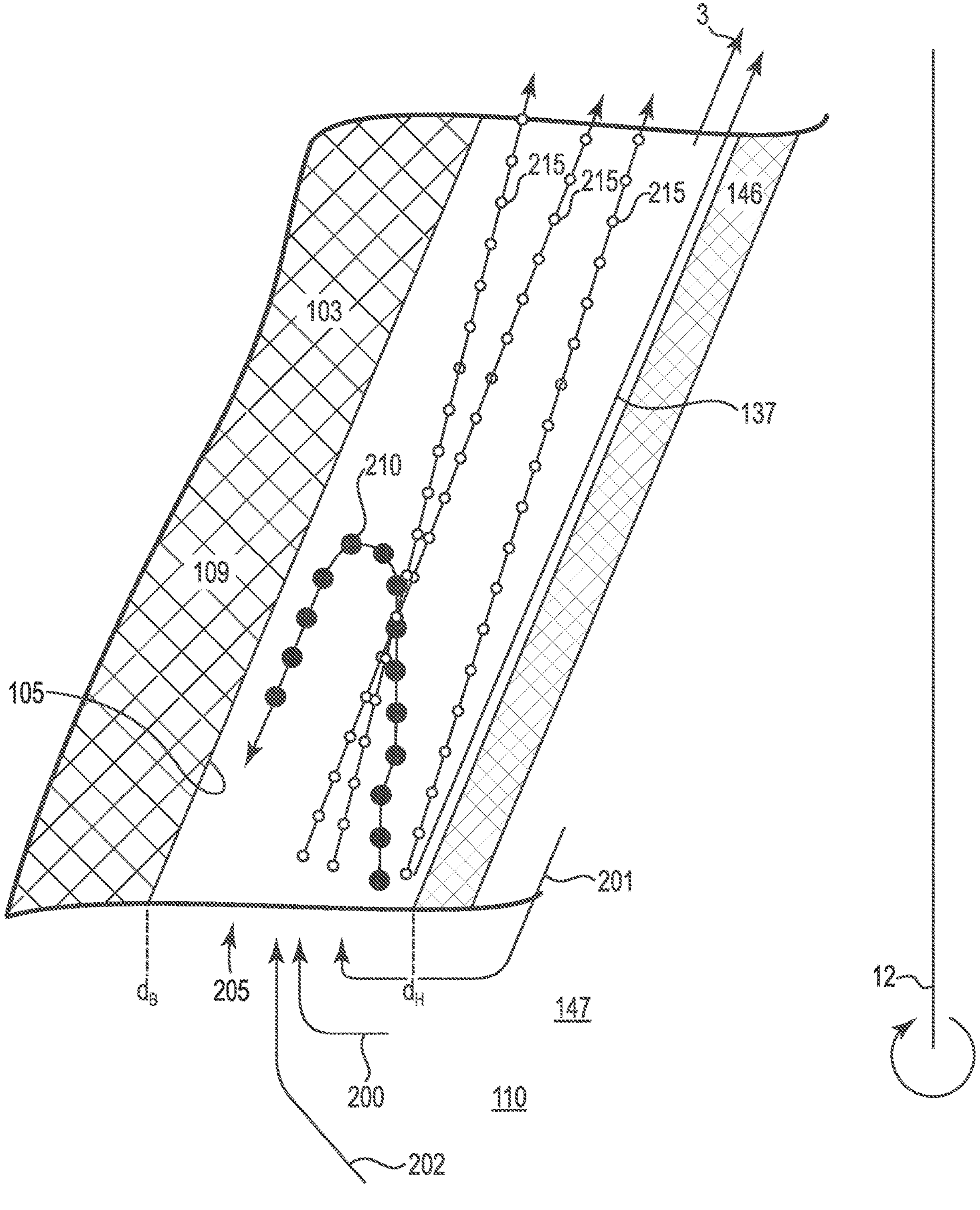
FIG. 4 illustrates secondary phase separation among solids in the solids/heavy phase flow path of the centrifuge shown in FIG. 2.

It has been discovered that continuously discharging a product stream such as second product stream 3, especially a product stream having a mixture of particles having different sizes and/or densities, can be challenging. FIG. 4 illustrates the flow of a second product stream 3 having a mixture of particles with different characteristics such as for example relatively larger and/or faster settling particles 210 and relatively smaller and/or slower settling particles 215. The arrows 200, 201, 202 depict flow paths of the solids travelling into the opening 205. It has been observed by the present inventors that at least a portion of the solids, such as particles 210 tend to stagnate and do not discharge with the rest of the second product stream (e.g., with liquid and smaller and/or slower settling particles 215). While not being bound by theory, it is believed that relatively high G-forces that are encountered near the outermost regions of the interior space of a bowl portion (e.g., relatively higher G-Forces near inside diameter de and/or $d_H$ as compared to the relatively lower G-Forces at de of the disk stack 118) can cause product streams to undergo an unintended "secondary" separation to an undue degree (e.g., where flow transitions at opening 205 as shown in FIG. 4), thereby hindering the ability to continuously discharge the product stream, especially as a relatively uniform mixture. It is believed that a product stream such as second product stream 3 can undergo such a secondary separation due to particles having one or more different characteristics such as, for example, 1) different particle sizes, 2) different settling velocities, 3) density differences among different particles; 4) weight differences of particles having the same density but different size; and/or 5) agglomeration of particles that may have the same or different density and/or the same or different weight and/or the same of different settling velocity. For example, as shown in FIG. 4, relatively smaller and/or slower settling particles 215 tend to separate from relatively larger and/or faster settling particles 210, thereby causing the larger and/or faster settling particles 210 to be classified from smaller and/or slower settling particles 215, thereby depleting the quantity of faster settling particles 210 and/or depleting solids concentration and/or changing the composition of second product stream 3 before it flows out of centrifuge 100 via second product pathway 137. Meanwhile the larger and/or faster settling particles 210 tend to "backslide" and concentrate in a stagnating manner near opening 205 instead of staying mixed with smaller and/or slower settling particles 215 in substantially the same composition and/or concentration as they arrived along the flow paths 200, 201, 202. As such, instead of being relatively uniformly mixed with larger particles 210, the smaller particles 215 are more diluted with liquid and/or depleted of larger particles 210 and/or depleted of overall solids concentration and/or varied in composition. It is further believed that stagnated and/or back-sliding solids 210 preferentially accumulate in the vicinity of $d_B$ and thereafter build-up radially inwardly toward axis 12 as additional stagnated solids accumulate over time, thereby having the effect of constricting the flow of and/or causing channeling of flow through opening 205.

According to the present disclosure, it has been discovered that locating one or more discrete, flow interference members in a product stream pathway can help disrupt the flow in the pathway and prevent secondary separation from occurring to an undue degree, e.g., within pathway 137. Advantageously, undue particle size and/or settling velocity classification can be avoided within pathway 137 and thereby a relatively uniform mixture of solid particles can be maintained in product stream 3. This facilitates continuously discharging a product stream such as a heavy phase product stream like second product stream 3 via second product stream pathway 137. The resulting improved continuous discharge can, if desired, allow the centrifuge to operate without having to discharge concentrated solid particles in stream 4 via discharge passageway 5 as often or at all as compared an identical product stream pathway that does not include any discrete, flow interference members according to the present disclosure. Prolonging steady state operations by reducing or eliminating the periodic desludging via discharge passageway 40 can avoid system disruptions and undue wear on the centrifuge. As shown in FIGS. 1A and 1B, discharge stream 4 is in fluid communication with solids collector 41 and discharge chute 42. Discharging continuously via nozzles (not shown) could also be avoided if desired as shall be self-evident to those skilled in the art, for reasons including but not limited to: 1) an improved method according to the present disclosure for continuously discharging separated solids known for having a tendency to form putty-like clumps; 2) an improved method according to the present disclosure for continuously discharging separated solids having substantively varying solids flow rates over time; and 3) an improved method according to the present disclosure facilitating online control and adjustment of concentration and/or consistency and/or flow of a continuously discharging separated solids stream.

The second product stream 3 can be discharged in a continuous manner for extended periods of time, which according to the product characteristics can be any of minutes, hours, or even weeks or months and furthermore at industrial level flowrates, which according to the centrifuge size and product characteristics can be from 1 to 350 gpm. The second product stream 3 can have relatively uniform physical and/or chemical properties (e.g., the profile of solid particle type(s) and size distribution does not vary to an undue degree).

As used herein, discrete, flow interference members are physical structures that function to disrupt flow in a flow path (e.g., the orderly axial-radial flow along a disk surface) to cause material to mix and/or re-mix instead of undergoing undue secondary separation as described above. The discrete, flow interference members can be located in one or more product stream pathways in the interior space of a bowl portion at one or more locations, especially at locations having relatively high G-forces. In some embodiments, as shown in the illustrative example of FIG. 6, a plurality of discrete, flow interference members 601 are located at least on the radially extending outer surface 156 of the region 159 (e.g., lower region) of separating disk 146 and/or a plurality of discrete, flow interference members 602 are located at least on the radially extending interior surface 105 of the sidewall portion 109 of the bowl top 103. These areas of second product stream pathway 137 can encounter some of the highest G-forces during separation and, therefore, can be more susceptible to undesired secondary separation.

Figure 6:
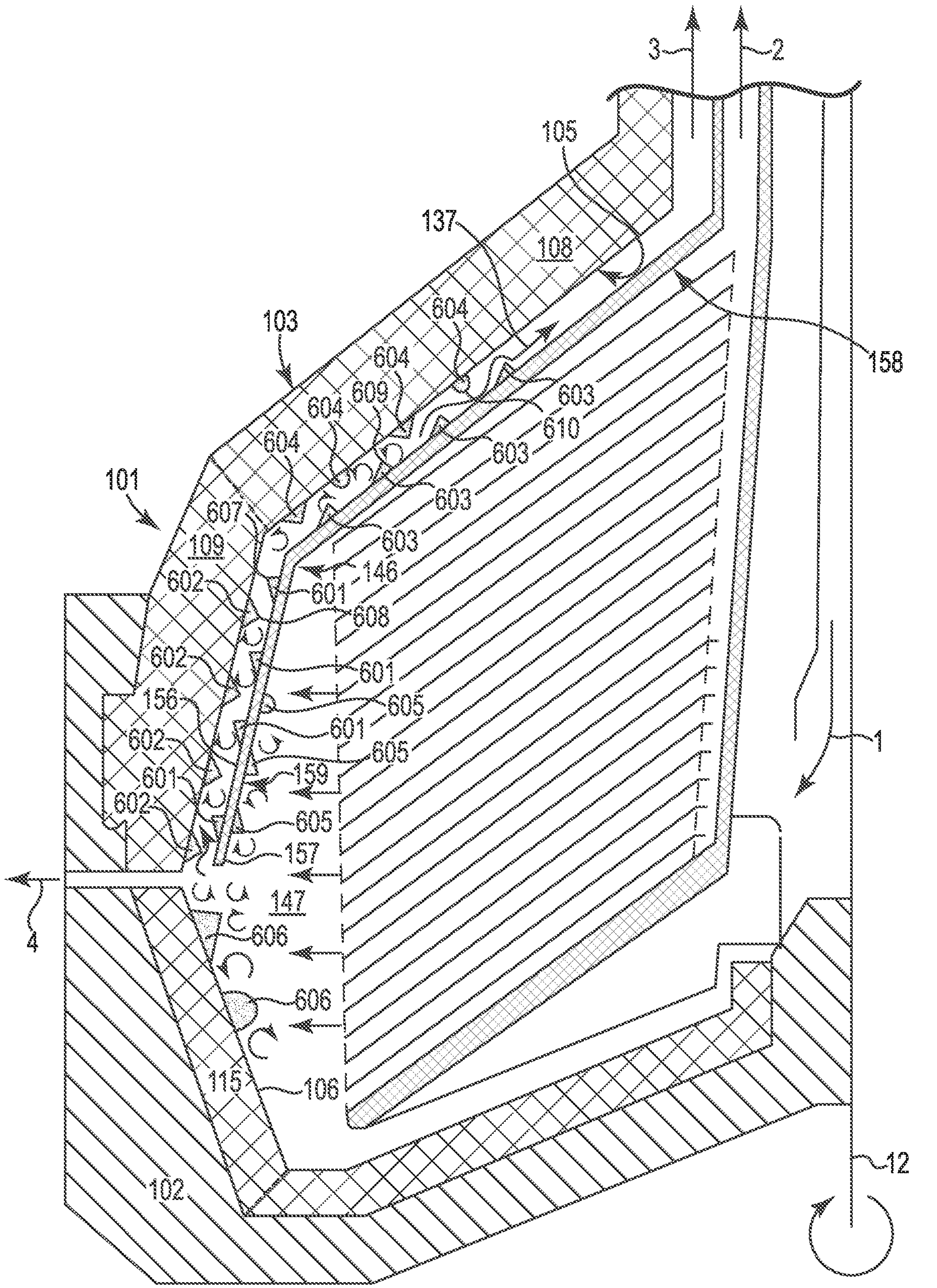
FIG. 6 is a schematic showing a partial, cross-sectional view of an embodiment of a centrifuge that separates a solid stream from liquid and that includes discrete, flow interference members according to the present disclosure.

Optionally, as shown in the illustrative example of FIG. 6, a plurality of discrete, flow interference members 603 are located on the radially extending outer surface 156 of the region 158(e.g., upper region) of separating disk 146 and/or a plurality of discrete, flow interference members 604 are located on the radially extending interior surface 105 of the sidewall portion 108 of the bowl top 103, which are also located in second product stream pathway 137. These areas of second product stream pathway 137 can also encounter relatively high G-forces during separation and, therefore, can be more susceptible to undesired secondary separation.

As shown in the illustrative example of FIG. 6 discrete, flow interference members 601, 602, 603 and 604 protrude away from the respective surface they are attached to and into the second product stream pathway 137 stream pathway to interrupt flow and cause mixing. Discrete, flow interference members may or may not contact a surface that is opposite to the surface from which a discrete, flow interference member protrudes. As shown in FIG. 6, discrete, flow interference members 601, 602, 603 and 604 do not contact the surface opposite to the surface which they protrude from, respectively, such that a gap is present between the discrete, flow interference members 601, 602, 603 and 604 and the surface opposite to the surface from which they protrude. Providing a gap can provide a balance between interrupting flow to cause mixing while at the same time not interrupting and/or constraining throughput through a product stream pathway 137 to an undue degree. In more detail, as shown in FIG. 6, a gap is present between the ends 607 of discrete, flow interference members 601 and the interior surface 105 of bowl top 103; and a gap is present between the ends 609 of discrete, flow interference members 603 and the interior surface 105 of bowl top 103. Similarly, a gap is present between the ends 608 of discrete, flow interference members 602 and the outer surface 156 of separating disk 146; and a gap is present between the ends 610 of discrete, flow interference members 604 and the outer surface 156 of separating disk 146. In some embodiments, such a gap can be in the range from greater than 0 mm to 10 mm, from greater than 0 mm to 9 mm, from greater than 0 mm to 8 mm, from greater than 0 mm to 7 mm, from greater than 0 mm to 6 mm, from greater than 0 mm to 5 mm, from greater than 0 mm to 4 mm, from greater than 0 mm to less than 3 mm, from greater than 0 mm to less than 2 mm, or even from greater than 0 mm to less than 1 mm.

Optionally, a plurality of discrete, flow interference members can be located outside second product stream pathway 137 to promote mixing and avoid undue secondary separation immediately prior to entering second product stream pathway 137. For example, as shown in FIG. 6, a plurality of discrete, flow interference members 605 are located on the inner surface 157 of the region 159 (e.g., lower region) of separating disk 146 and/or a plurality of discrete, flow interference members 606 are located on the interior surface 106. Locating discrete, flow interference members in this manner can help mix solids that tend to otherwise collect in solids holding space 147 and which thereafter cause loss of flow and/or channeling of less viscous solids.

Figure 7:
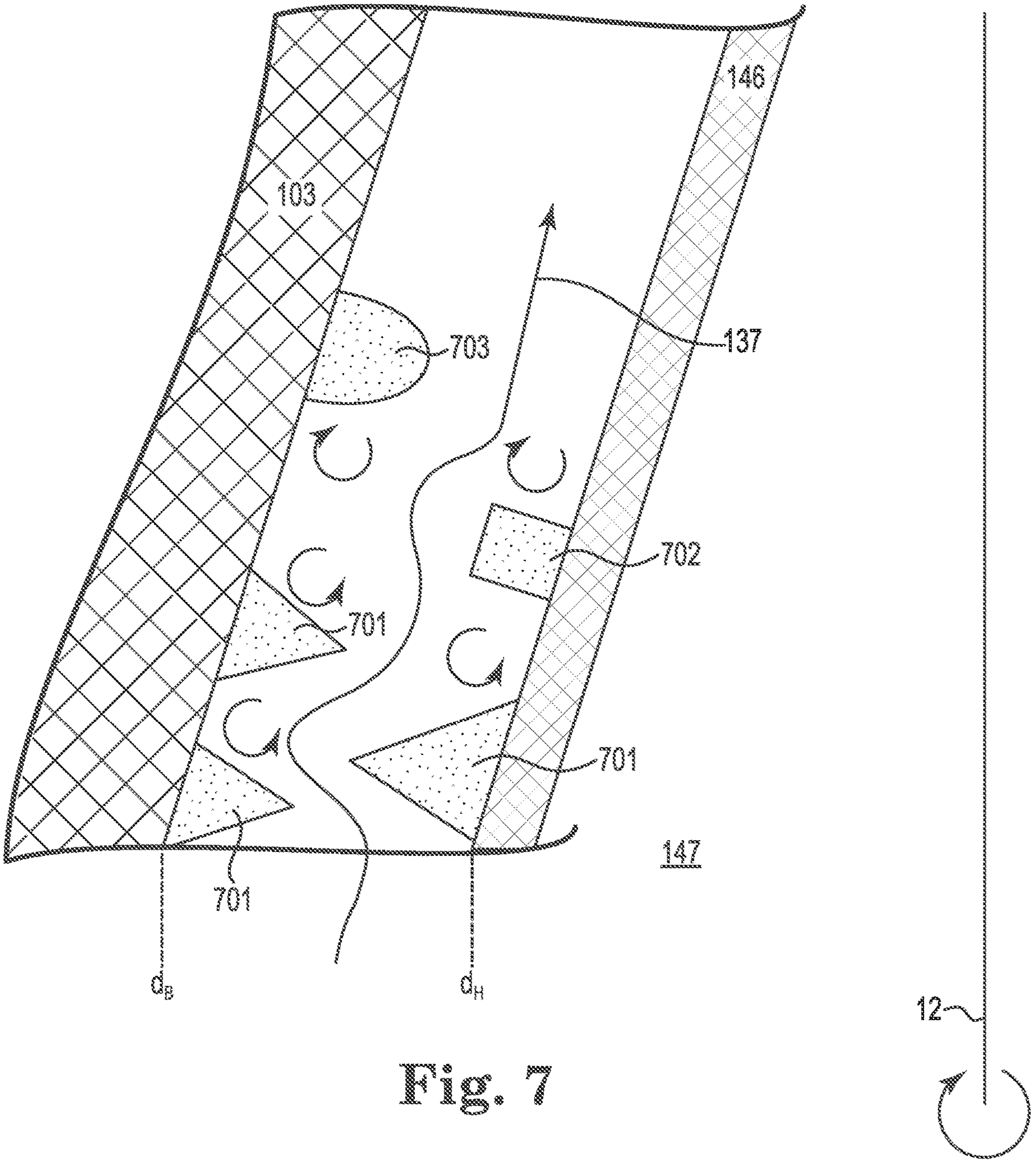
FIG. 7 shows a close-up, partial, cross-sectional view of another embodiment of a centrifuge that separates a solid stream from liquid and that includes discrete, flow interference members according to the present disclosure.

Discrete, flow interference members can have a wide range of shapes and sizes, which can be selected to interrupt flow such as cause mixing and can depend on factors such as type of one or more constituents in a feed stream. By way of non-limiting example, FIG. 7 shows a plurality of pyramidal-shaped discrete, flow interference members 701, cube-shaped or rectangular-shaped discrete, flow interference members 702, and rounded or spherical-shaped discrete, flow interference members 703.

Figure 9A:
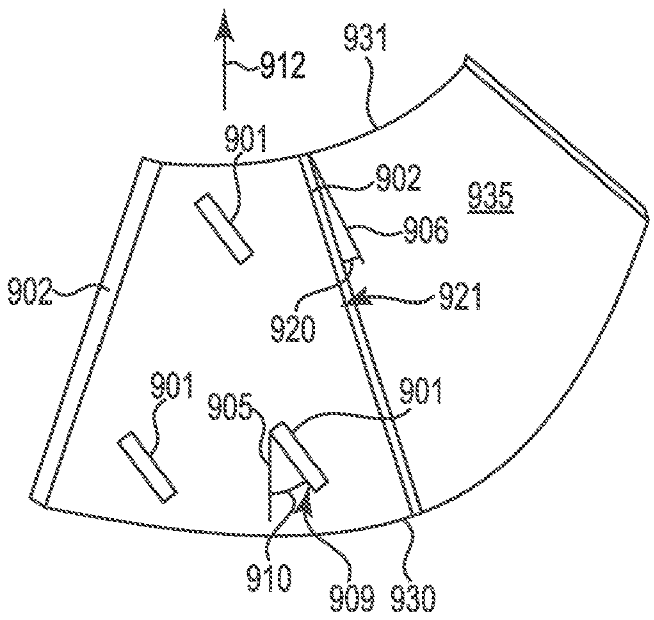
FIG. 9A shows a partial, perspective view of a separating disk that includes another embodiment of discrete, flow interference members according to the present disclosure.

FIG. 9A shows a separating disk 935 that includes another embodiment of a plurality of discrete, flow interference members 901 according to the present disclosure.

Figure 9B:
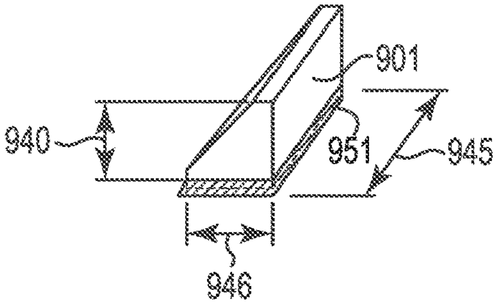
FIG. 9B shows a perspective view of a discrete, flow interference member shown in FIG. 9A.
Figure 9C:
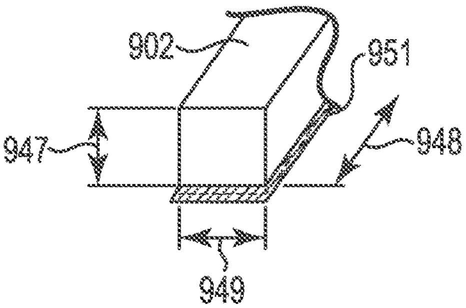
FIG. 9C shows a perspective view of a structural spacer rib shown in FIG. 9A.
Figure 9D:
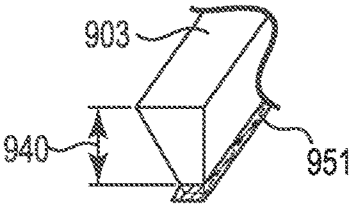
FIG. 9D shows a perspective view of an alternative embodiment for a discrete, flow interference member shown in FIG. 9A.

Discrete, flow interference members may or may not have a tapered profile as shown in FIGS. 9B and 9D. In the illustrative example of FIGS. 9A and 9B, discrete, flow interference members 901 have a height 940 from greater than 0 to 100 mm, from greater than 0 to 50 mm, from greater than 0 to 20 mm, or even from greater than 0 to less than 15 mm. In some embodiments, discrete, flow interference members 901 have a length 945 from greater than 0 to 100 mm, from greater than 0 to 50 mm, or even from 10 to 40 mm. In some embodiments, discrete, flow interference members 901 have a width 946 from greater than 0 to 100 mm, from greater than 0 to 50 mm, or even from 5 to 30 mm.

In some embodiments, as shown in the illustrative example of FIG. 9A, discrete, flow interference members 901 may be oriented relative to a datum 905. For each interference member 901, datum 905 is parallel to a line that extends from the midpoint of side 909 of each interference member, parallel to the surface of the separating disk 935, to the rotational axis 912. One or more discrete, flow interference members 901 may be oriented relative to datum 905 such that side 909 forms an angle 910 so that a given discrete, flow interference member 901 disrupts the axial-radial flow along the separating disk 935 disk surface to cause material to mix and/or re-mix instead of undergoing undue secondary separation as described above. In some embodiments, side 909 forms an angle 910 in the range of 0 to 360 degrees, from greater than 0 to 360 degrees, or even from 15 to 345 degrees. It is noted that if discrete, flow interference member 901 has an angle 910 of zero, the discrete, flow interference member 901 (unlike a structural spacer rib 902) has a surface feature (e.g., a gap (as described above), a shape, and/or a profile) that causes material to mix and/or re-mix instead of undergoing undue secondary separation as described above. In some embodiments, one or more discrete, flow interference members 901 may be oriented at different angles as compared to other discrete, flow interference members 901. In some embodiments, one or more discrete, flow interference members 901 may be oriented at the same angle as compared to other discrete, flow interference members 901.

In the illustrative example of FIG. 9D, a discrete, flow interference members 903 may have a tapered profile that is essentially the same as discrete, flow interference members 901 in FIG. 9B but positioned in an inverted manner. In some embodiments, structural spacer ribs 902 extend continuously or discontinuously from the outside diameter 930 to inside diameter 931 of separating disk 935 and may be oriented relative to the datum 906. For each structural spacer rib 902, datum 906 is parallel to a line that extends from the midpoint of side 921 of each structural spacer rib, parallel to the surface of the separation disk, to the rotational axis 912. One or more structural spacer ribs 902 may be oriented relative to datum 906 such that side 921 forms an angle 920 so that the structural spacer rib 902 functions as structural support to maintain a gap/space for fluid to flow between opposing surfaces. The structural spacer ribs 902 are not intended to interrupt flow to a significant degree. For illustration purposes, as shown in FIG. 9A, angle 920 is shown as greater than zero. In some embodiments, angle 920 corresponds to approximately zero since the side 921 corresponds to the central axis of rotation 912. In some embodiments, angle 920 may be in the range of from 0 to 30 degrees, or even be curved, curve-linear or the like. As shown in FIG. 9C, structural spacer rib 902 has a length, height and width.

Figure 9E:
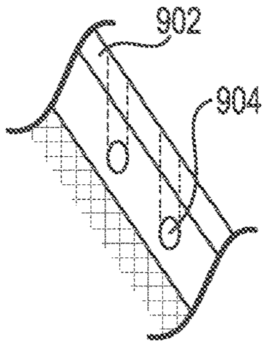
FIG. 9E shows a perspective view of a structural spacer rib shown in FIG. 9A that includes optional holes functioning as flow pathways between structural spacer ribs.

In some embodiments, structural spacer ribs 902 have a height 947 from greater than 0 to 100 mm, from greater than 0 to 50 mm, from greater than 0 to 20 mm, from 15 to 100 mm, or even from 25 to 100 mm. In some embodiments, structural spacer ribs 902 have a height that is greater than the height of discrete, flow interference members 901. In some embodiments, structural spacer ribs 902 have a length 948 from 10 to 500 mm, from 50 to 400 mm, or even from 20 to 300 mm. In some embodiments, structural spacer ribs 902 have a length that is greater than the length of discrete, flow interference members 901. In some embodiments, structural spacer ribs 902 have a width 949 from greater than 0 to 100 mm, from greater than 0 to 50 mm, from greater than 0 to 20 mm, from 15 to 100 mm, or even from 25 to 100 mm. In some embodiments, each structural spacer rib 902 has the same width among all structural spacer ribs 902. In some embodiments, each structural spacer rib 902 has the same height among all structural spacer ribs 902. In some embodiments one or more structural spacer ribs may have a length spanning the distance from the outside diameter (perimeter) 930 and inside diameter (perimeter) 931 as shown in FIG. 9A. In some embodiments, as shown in FIG. 9E, one or more structural spacer ribs 902 may have openings (holes) 904 that allow flow therethrough.

Structural spacer ribs can be located on a surface in a variety of ways. For example, structural spacer ribs can be attached and/or oriented individually using a wide variety of fastening techniques (adhesives, welding, mechanical fasteners (e.g., screws and the like), etc.) and/or can be integrally formed with the surface from which they protrude. As shown in FIG. 9C, structural spacer ribs 902 are attached to the upper surface of separating disk 935 via weld 951.

Figure 10A:
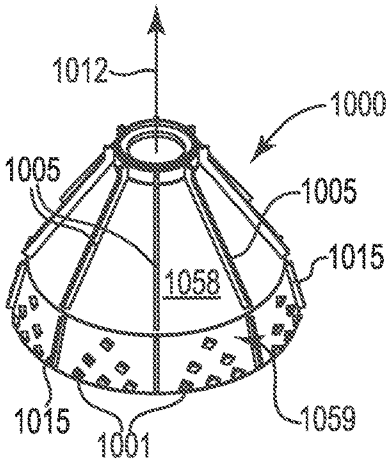
FIG. 10A shows a top perspective view of an embodiment of a separating disk having discrete, flow interference members according to the present disclosure.
Figure 10B:
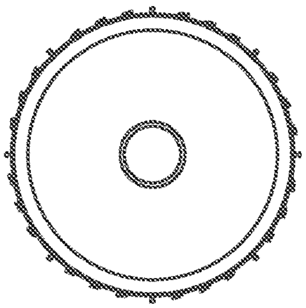
FIG. 10B shows a bottom plan view of the separating disk in FIG. 10A.
Figure 10C:
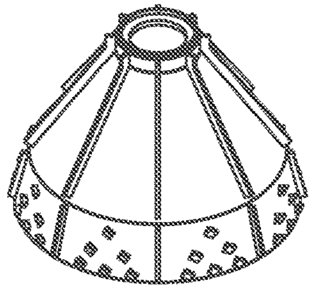
FIG. 10C shows a top perspective view rotated 90 degrees about axis 1012 relative to the view in FIG. 10A.
Figure 10D:
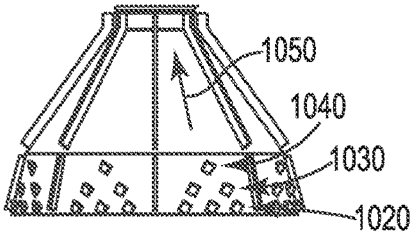
FIG. 10D shows a side elevation view of the separating disk in FIG. 10A.
Figure 10E:
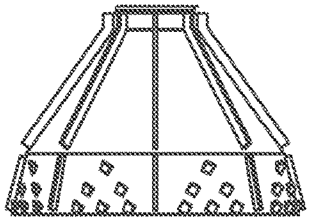
FIG. 10E shows a side elevation view rotated 90 degrees about axis 1012 relative to the view in FIG. 10D.
Figure 10F:
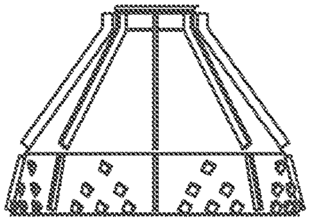
FIG. 10F shows a side elevation view rotated 90 degrees about axis 1012 relative to the view in FIG. 10E.
Figure 10G:
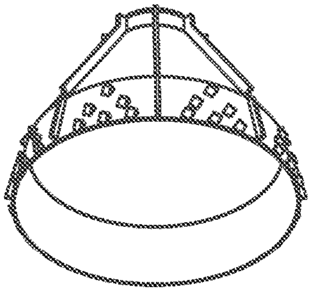
FIG. 10G shows a bottom perspective view of the separating disk in FIG. 10A.
Figure 10H:
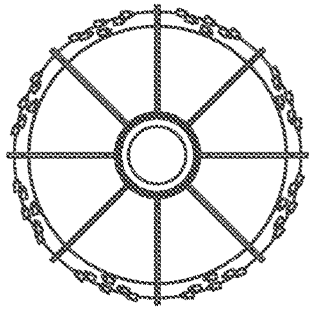
FIG. 10H shows a top plan view of the separating disk in FIG. 10A.
Figure 10I:
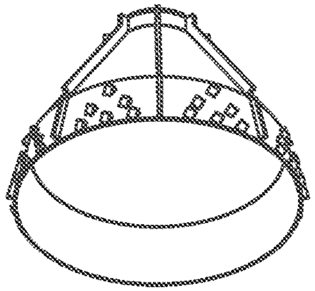
FIG. 10I shows a bottom perspective view rotated 90 degrees about axis 1012 relative to the view in FIG. 10G.

FIGS. 10A-10I show multiple views of an embodiment of a separating disk 1000 having discrete, flow interference members 1001 according to the present disclosure. FIGS. 10A-10I illustrate that separating disk 1000 is symmetrical about a vertical plane through axis 1012. As shown in FIG. 10A, separating disk 1000 has a first region 1058 that extends radially outwardly relative to its axis of rotation 1012 and a second region 1059 that also extends radially outwardly from where first region 1058 intersects second region 1059, but at a different angle as compared to first region 1058. It is noted that first region 1058 is substantially identical to first region 558 in each of FIGS. 5A and 5B. It is noted that second region 1059 is substantially identical to second region 559 in FIG. 5B, except that second region 1059 includes a plurality of discrete, flow interference members 1001. In this embodiment, discrete, flow interference members 1001 are located only in second region 1059 and have a tapered or ramp profile similar to discrete, flow interference members 901. Also, the discrete, flow interference members 1001 are positioned between adjacent structural spacer ribs 1015. In some embodiments, the length of a discrete, flow interference member within a region does not extend from one end of the region to the other end of the region like a structural spacer rib does. For example, as shown in FIG. 10, each of the plurality of discrete, flow interference members 1001 have length and width dimensions that are less than the length dimension of each structural spacer rib 1015. Also, as shown in FIG. 10, a discrete, flow interference member 1001 (or members 1001) between adjacent structural spacer ribs 1015 and within a horizontal row is offset circumferentially from a discrete, flow interference member 1001 (or members 1001) in each adjacent row. The rows are offset from one another in the direction of product stream flow 1050. These offsets can help disrupt a flow of a product stream, cause mixing and/or re-mixing and avoid undesired secondary separation and any resulting stagnation and/or back-sliding of solids as described herein. For example, FIG. 10D shows three horizontal rows 1020, 1030 and 1040 of discrete, flow interference members 1001 (row 1040 includes only one discrete, flow interference member 1001).

Optionally, one or more discrete, flow interference members 1001 could be located in first region 1058.

In some embodiments, as shown in FIG. 10, each structural spacer rib 1005 in first region 1058 aligns with (shares a common central bisecting plane) an adjacent structural spacer rib 1015 in second region 1059. In some embodiments, as shown in FIG. 10, second region 1059 has the same number of structural spacer ribs 1015 as structural spacer ribs 1005 in first region 1058.

The number of discrete, flow interference members included on a surface or in a region can be selected as desired. In some embodiments, a centrifuge can include at least one discrete, flow interference member. In some embodiments, a centrifuge (e.g., the interior surface of bowl portion and/or surfaces of a separating disk) can include from 2 to 600 discrete, flow interference members; from 2 to 500 discrete, flow interference members; from 2 to 400 discrete, flow interference members; from 2 to 300 discrete, flow interference members; from 2 to 200 discrete, flow interference members; from 2 to 150 discrete, flow interference members; from 2 to 100 discrete, flow interference members; from 2 to 75 discrete, flow interference members; from 2 to 50 discrete, flow interference members; or even from 2 to 30 discrete, flow interference members. In some embodiments, a centrifuge can include from 20 to 600 discrete, flow interference members; from 30 to 500 discrete, flow interference members; from 40 to 400 discrete, flow interference members; from 50 to 300 discrete, flow interference members; from 100 to 200 discrete, flow interference members; or even from 100 to 150 discrete, flow interference members. For example, each region 1059 between adjacent structural spacer ribs 1015 can include 1 or more, 2 or more, 3 or more, 4 or more, 5 or more, 6 or more, or even 7 or more discrete, flow interference members (e.g., from 2 to 20 discrete, flow interference members). As shown in the illustrative example of FIG. 10, each area in region 1059 between adjacent structural spacer ribs 1015 has 6 discrete, flow interference members. Similarly, each area in region 1058 between adjacent structural spacer ribs 1015 can include 3 or more, 4 or more, 5 or more, 6 or more, or even 7 or more discrete, flow interference members (e.g., from 2 to 20 discrete, flow interference members). Furthermore, any area, surface or region described herein can include any desired number of discrete, flow interference members such as 3 or more, 4 or more, 5 or more, 6 or more, or even 7 or more discrete, flow interference members (e.g., from 2 to 50 discrete, flow interference members, or even from 3 to 30 discrete, flow interference members).

Discrete, flow interference members can be made of a variety of materials, which can be selected based on a variety of factors. For example, it is desirable to construct discrete, flow interference members out of material that is compatible with the feed and product streams and that is compatible with the high G-Forces encountered during separation. In some embodiments, discrete, flow interference members can be rigid and made out of material chosen from metal, plastic, ceramic, composites, combinations of these, and the like. Discrete, flow interference members described herein can be made out of various metals such as iron and iron alloys, aluminum and aluminum alloys, and titanium and titanium alloys. For example, they may be made of various grades of stainless steel. The discrete, flow inference members may be heat treated to improve hardness, toughness, and/or some other property. For example, the discrete, flow inference members may be made of heat treated stainless steel.

Figure 8:
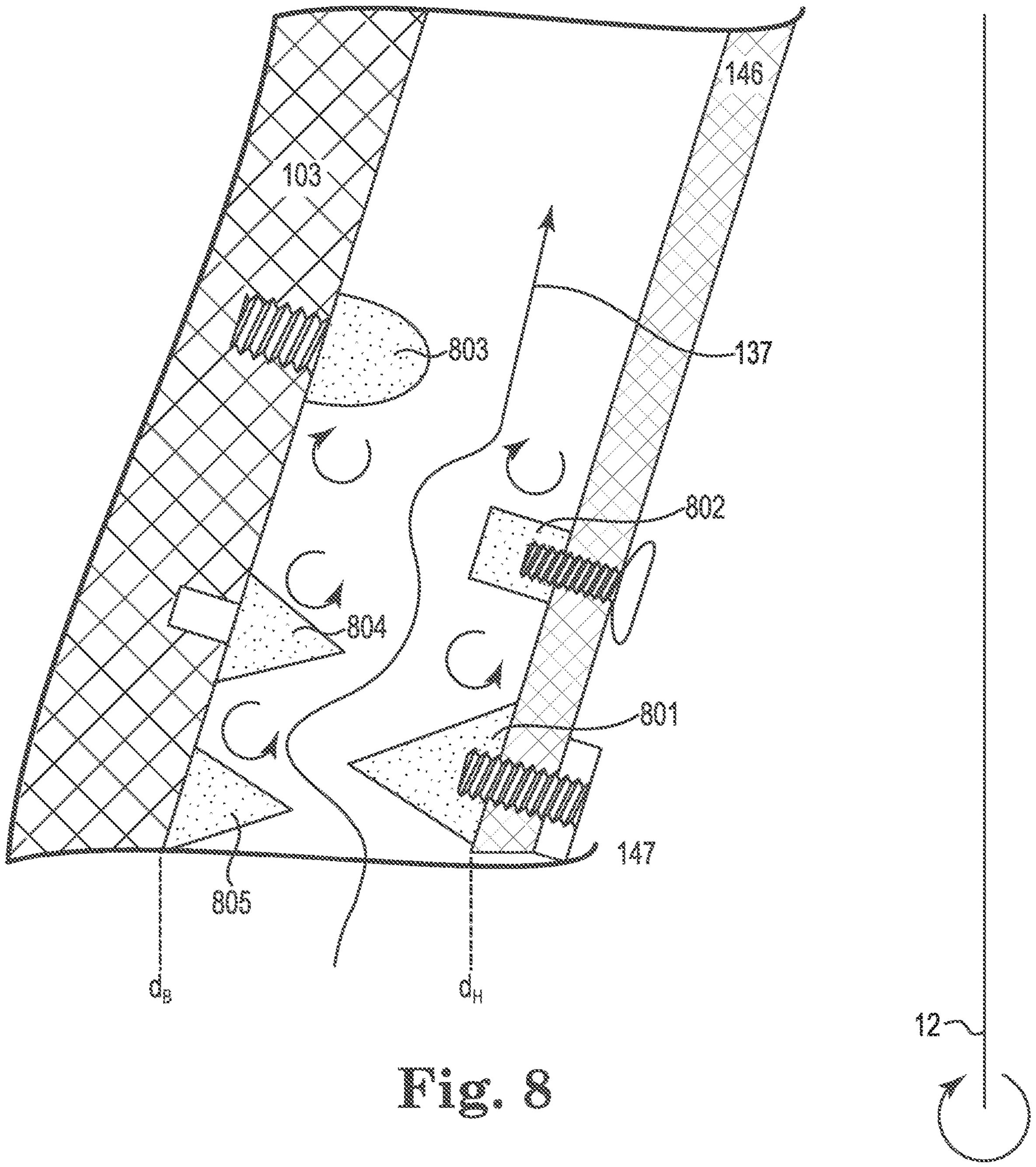
FIG. 8 shows an alternative embodiment of the centrifuge shown in FIG. 7, where the discrete, flow interference members are fastened using fasteners.

Discrete, flow interference members can be located on a surface in a variety of ways. For example, discrete, flow interference members can be attached and/or oriented individually using a wide variety of fastening techniques (adhesives, welding, mechanical fasteners (e.g., screws and the like), etc.) and/or can be integrally formed with the surface from which they protrude. For example, as shown in FIG. 7, each of the discrete, flow interference members 701, 702, and 703 are integrally formed on the surface from which they extend. Alternatively, one or more discrete, flow interference members can be attached to a surface from which they extend via threaded connections, an adhesive connection, welding, and the like. As shown in FIG. 8, each of the discrete, flow interference members 801, 802, and 803 are attached via threaded connections. Discrete, flow interference member 804 is attached via a press-fit plug and discrete, flow interference member 805 is integrally formed on the surface from which it extends.

Because of the relatively high G-Forces encountered and centrifuge design requirement for vibrational stability, it can be desirable for discrete, flow interference members to be located (e.g., whether integral with another component or fastened to another component) in a rigid and non-movable (static) manner. In some embodiments, having one or more discrete, flow interference members removably attached as shown in FIG. 8 can permit them to be readily adjusted during equipment and process installation and/or optimization according to any unique requirements of a process.

The present disclosure also includes systems and methods of separating at least one feed stream in a centrifuge into at least a first product stream and a second product stream. To help avoid undue secondary separation and any resulting stagnation of solids as described above, the present disclosure includes disrupting a flow of a product stream within a centrifuge, while at the same time providing desirable product stream throughput and/or characteristics (e.g., concentration, composition, and the like), especially on a continuous basis. In some embodiments, disrupting the flow of a product stream can cause the contents of the product stream to one or more of mix, shear, and the like to help maintain the characteristics of the product stream that it has when it is separated from the feed stream. For example, the flow of a product stream can be disrupted according to the present disclosure to mix solid particles and avoid undesired secondary separation (as discussed above), thereby maintaining the product stream as a relatively homogenous mixture, and/or even a more concentrated mixture, as compared to if the product stream was not disrupted. A variety of techniques, alone or in combination, for disrupting the flow of a product stream in a product stream pathway can be used according to the present disclosure. For example, one or more discrete, flow interference members as described above can be located in a product stream pathway to disrupt the flow of the product stream. The flow of a product stream can be disrupted in one or more directions. For example, the flow can be disrupted in the axial direction defined by axis 12 and/or a radial direction perpendicular to axis 12.

Following are exemplary embodiments of the present disclosure:

1. A centrifuge having a central axis of rotation, wherein the centrifuge comprises:
   a) a bowl portion comprising:
      i) at least one feed stream inlet and at least a first product stream outlet and a second product stream outlet;
      ii) a bowl portion having an interior surface that defines an interior space, wherein the at least one feed stream inlet and the at least two product stream outlets are in fluid communication with the interior space;

b) a feed stream pathway in fluid communication with the at least one feed stream inlet and the interior space of the bowl portion; and c) two or more product stream pathways, wherein the two or more product stream pathways comprise at least:

i) a first product stream pathway; and ii) a second product stream pathway wherein the second product stream pathway has an inlet in the interior space, wherein the second product stream pathway comprises a space between a first radially extending surface and a second radially extending surface, and wherein at least one of the first radially extending surface and the second radially extending surface comprises at least one discrete, flow interference member that is located in the second product stream pathway to disrupt the flow of a second product stream, wherein the first product stream pathway is located between the second product stream pathway and the central axis of rotation.

2. The centrifuge of embodiment 1, wherein the second product stream pathway is adjacent to the interior surface of the bowl portion.

3. The centrifuge of any preceding embodiment, wherein the at least one discrete, flow interference member is attached to the first radially extending surface and protrudes toward the second radially extending surface.

4. The centrifuge of embodiment 3, wherein the at least one discrete, flow interference member does not contact the second radially extending surface.

5. The centrifuge of any preceding embodiment, wherein the at least one discrete, flow interference member is attached to the first radially extending surface and protrudes toward the second radially extending surface, wherein the at least one discrete, flow interference member has an end adjacent to the second radially extending surface and forms a gap (perpendicular distance) between the end and the second radially extending surface, wherein the gap is from greater than 0 mm to 10 mm, from greater than 0 mm to 9 mm, from greater than 0 mm to 8 mm, from greater than 0 mm to 7 mm, from greater than 0 mm to 6 mm, from greater than 0 mm to 5 mm, from greater than 0 mm to 4 mm, from greater than 0 mm to less than 3 mm, from greater than 0 mm to less than 2 mm, or even from greater than 0 mm to less than 1 mm.

6. The centrifuge of any preceding embodiment, wherein the at least one discrete, flow interference member is integrally formed on the first radially extending surface or is attached to the first radially extending surface with a fastener (e.g., threaded screw, adhesive, and the like).

7. The centrifuge of any preceding embodiment, wherein the at least one discrete, flow interference member is attached to the second radially extending surface and protrudes toward the first radially extending surface.

8. The centrifuge of embodiment 7, wherein the at least one discrete, flow interference member attached to the second radially extending surface does not contact the first radially extending surface.

9. The centrifuge of any preceding embodiment, wherein the at least one discrete, flow interference member is attached to the second radially extending surface and protrudes toward the first radially extending surface, wherein the at least one discrete, flow interference member has an end adjacent to the first radially extending surface and forms a gap (perpendicular distance) between the end and the first radially extending surface, wherein the gap is from greater than 0 mm to 10 mm, from greater than 0 mm to 9 mm, from greater than 0 mm to 8 mm, from greater than 0 mm to 7 mm, from greater than 0 mm to 6 mm, from greater than 0 mm to 5 mm, from greater than 0 mm to 4 mm, from greater than 0 mm to less than 3 mm, from greater than 0 mm to less than 2 mm, or even from greater than 0 mm to less than 1 mm.

10. The centrifuge of any preceding embodiment, wherein the at least one discrete, flow interference member is integrally formed on the second radially extending surface or is attached to the second radially extending surface with a fastener (e.g., threaded screw, adhesive, and the like).

11. The centrifuge of any preceding embodiment, wherein the second product stream pathway has an inlet adjacent to the interior surface of the bowl portion.

12. The centrifuge of any preceding embodiment, further comprising at least one disk having an outside diameter, wherein the at least one disk is positioned in the interior space of the bowl portion.

13. The centrifuge of any of embodiments 1-11, further comprising at least one disk having an outside diameter and a central opening having an inside diameter, wherein the at least one disk is positioned in the interior space of the bowl portion.

14. The centrifuge of any of embodiments 1-11, further comprising a plurality of disks (e.g., a disk stack 118) positioned in the interior space of the bowl portion, wherein each disk has the outer diameter and the central opening having the inside diameter, wherein each disk is adjacent to and spaced apart from at least one other disk in a stacked manner to form a gap (perpendicular distance) between adjacent disks, wherein the gap between adjacent disks defines a liquid fraction flowpath so that liquid fraction can flow toward the inner diameter, wherein each liquid fraction flowpath is in fluid communication with the first product stream pathway.

15. The centrifuge of any of embodiments 12-14, wherein the first radially extending surface comprises the interior surface of the bowl portion and the second radially extending surface comprises a disk adjacent to the interior surface of the bowl portion, wherein a perpendicular distance between the interior surface of the bowl portion and the disk adjacent to the interior surface of the bowl portion is equal to or greater than a shortest perpendicular distance between any adjacent disks.

16. The centrifuge of any of embodiments 12-14, further comprising a separating disk positioned between the at least one disk or an outermost disk of the plurality of disks, and the interior surface of the bowl portion, wherein the first radially extending surface comprises the interior surface of the bowl portion and the second radially extending surface comprises the surface of the separating disk adjacent to the interior surface of the bowl portion.

17. The centrifuge of embodiment 16, wherein a perpendicular distance between the interior surface of the bowl portion and the surface of the separating disk adjacent to the interior surface of the bowl portion is equal to or greater than a shortest perpendicular distance between any adjacent disks.

18. The centrifuge of any preceding embodiment, wherein the first radially extending surface comprises at least a sidewall portion (e.g., sidewall portion 109) and the second radially extending surface comprises at least a region (e.g., region 159), wherein the sidewall portion and the region define the inlet (e.g., 205) of the second product stream pathway, and wherein at least the sidewall portion and/or the region comprise the at least one discrete, flow interference member that is located in the second product stream pathway.

19. The centrifuge of embodiment 18, wherein sidewall portion is a first sidewall portion and the region is a first region, wherein the first radially extending surface further comprises at least a second sidewall portion (e.g., sidewall portion 108) and the second radially extending surface further comprises at least a second region (e.g., region 158), and further comprising one or more discrete, flow interference members located on the second sidewall portion and/or the second region and in the second product stream pathway.

20. The centrifuge of embodiment 19, wherein the first region comprises a first surface (e.g., surface 156) facing the first sidewall portion and second surface (e.g., surface 157) that is opposite the first surface, and further comprising one or more discrete, flow interference members located on the second surface.

21. The centrifuge of any preceding embodiment, further comprising a feed stream tube located along a central axis of the centrifuge to define a feed stream flow path, wherein the feed tube has an inlet and an outlet.

22. The centrifuge of any preceding embodiment, further comprising one or more radially extending structural spacer ribs between the first radially extending surface and the second radially extending surface.

23. The centrifuge of embodiment 22, wherein adjacent structural spacer ribs define a portion of the second product stream pathway.

24. The centrifuge of any preceding embodiment, wherein the bowl portion comprises a bowl bottom and a bowl top, and wherein an interior surface of the bowl bottom comprises at least one discrete, flow interference member to disrupt the flow along the bowl bottom interior surface.

25. The centrifuge of any preceding embodiment, further comprising a third product stream pathway, wherein the third product stream pathway is located between the second product stream pathway and the first product stream pathway (e.g., a three-phase centrifuge).

26. The centrifuge of any preceding embodiment, wherein the at least one discrete, flow interference member comprises a plurality of discrete, flow interference members (from 2 to 600 discrete, flow interference members).

27. A method of separating at least one feed stream in a centrifuge into at least a first product stream and a second product stream, wherein the method comprises:
   a) providing the at least one feed stream to a feed stream inlet of a centrifuge, wherein the centrifuge has a central axis of rotation and a bowl portion having an interior surface that defines an interior space;
   b) separating two or more product streams from the at least one feed stream in the interior space of the bowl portion, wherein a first product stream flows in a first product stream pathway of the centrifuge and a second product stream flows into a second product stream pathway adjacent to the interior surface of the bowl portion; and
   c) disrupting a flow of the second product stream in the second product stream pathway.

28. The method of embodiment 27, wherein disrupting a flow of the second product stream in the second product stream pathway is caused by at least one discrete, flow interference member located in the second product stream pathway to disrupt the flow of a second product stream, wherein the second product stream pathway comprises a space between a first radially extending surface and a second radially extending surface, and wherein at least one of the first radially extending surface and the second radially extending surface comprises the at least one discrete, flow interference member.

29. The method of any preceding embodiment, further comprising a third product stream that flows in a third product stream pathway, wherein the third product stream pathway is located between the second product stream pathway and the first product stream pathway, wherein the first product stream pathway is located between the third product stream pathway and the central axis of rotation (e.g., a three-phase centrifuge).

Example

Figure 11:
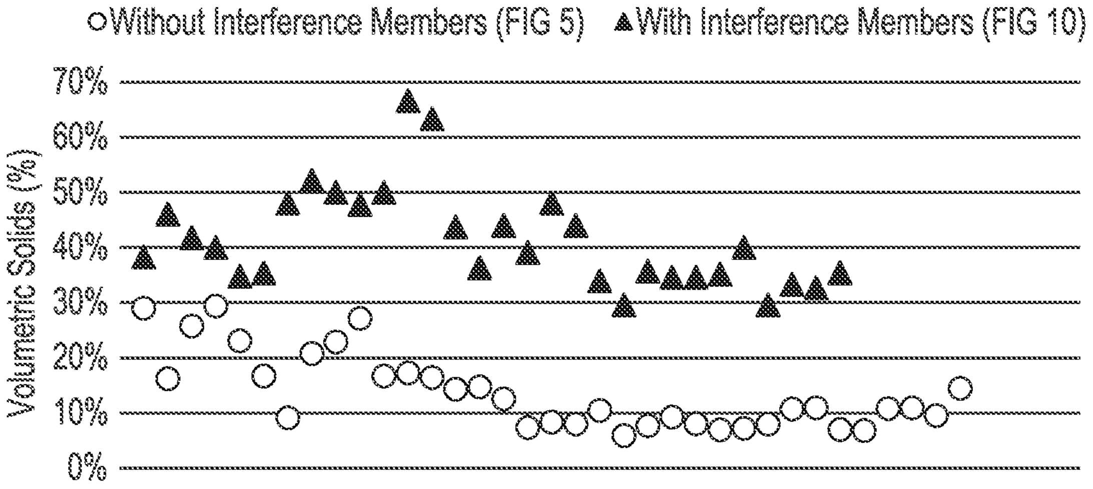
FIG. 11 shows the percent solids content based on volume of each second product stream 3 produced in the Example below.

Testing was conducted on two different disk stack centrifuges, identical in all respects except for the sole difference described below. Testing involved feed and product streams like shown in FIG. 1B. That is, a feed stream 1 was fed to a disk stack centrifuge to be separated to form a first product stream 2, a second product stream 3, and a discharge stream 4. The first disk stack centrifuge included a separating disk configured with structural spacer ribs, but without discrete, flow interference members like the separating disk 500 in FIG. 5A. The second disk stack centrifuge included a separating disk configured with structural spacer ribs and with discrete, flow interference members like the separating disk 1000 in FIGS. 10A-10I as the sole design difference to the first disk stack centrifuge. FIG. 11 shows the volumetric solids content of each second product stream 3 produced over the testing.

Discharging at an interval of as little as two (2) minutes via stream 4 without discrete, flow interference members (as in FIG. 5A) produced a heterogenous material marked predominantly by amorphous putty-like chunks within a small amount of free-flowing thickened paste-like fraction. Discharging via stream 4 at the same discharge volumes and intervals while using a separating disk with discrete, flow interference members (as in FIGS. 10A-10I) produced a homogeneous discharge material that was overall less concentrated and without the putty like chunks. This discharge material was similar to the paste-like fraction of the previous example but more concentrated and viscous and was barely free flowing. This absence of chunks was furthermore also observed even after substantially longer discharging intervals of 5 or 10 minutes and comprising the same discharge volume. Table 1 shows gravimetric solids (% w/w) content of stream 4 discharged material produced over the comparative testing.

The absence of such amorphous putty-like chunks is advantageous to achieving continuous operation, consistency and even the opportunity for convergence of composition and concentration of streams 3 and 4, avoidance of risk of hard plugging of disk stack with such putty-like chunks and the consequent negative impacts on separation efficiency, reduced disruptions of discharges as well as their wear and tear on the centrifuge itself over time.

TABLE 1

| Testing configuration | Stream 4 (FIG. 1B) w/w % solids |
|---|---|
| Without discrete, flow interference members (FIG. 5) | 29.8 |
| Without discrete, flow interference members (FIG. 5) | 23.7 |
| Without discrete, flow interference members (FIG. 5) | 26.0 |
| With discrete, flow interference members (FIG. 10) | 20.9 |
| With discrete, flow interference members (FIG. 10) | 19.9 |

What is claimed is:

1. A centrifuge having a central axis of rotation, wherein the centrifuge comprises:

a) a bowl portion comprising:
  i) at least one feed stream inlet and at least a first product stream outlet and a second product stream outlet;
  ii) an interior surface that defines an interior space, wherein the at least one feed stream inlet and the at least two product stream outlets are in fluid communication with the interior space;
b) a feed stream pathway in fluid communication with the at least one feed stream inlet and the interior space of the bowl portion; and
c) two or more product stream pathways, wherein the two or more product stream pathways comprise at least:
  i) a first product stream pathway; and
  ii) a second product stream pathway wherein the second product stream pathway has an inlet in the interior space, wherein the second product stream pathway comprises a space between a first radially extending surface and a second radially extending surface, wherein the inlet is adjacent to the interior surface of the bowl portion and permits fluid flow from the interior space into the second product stream pathway, wherein at least the second radially extending surface comprises at least one discrete, flow interference member that is located in the second product stream pathway to disrupt the flow of a second product stream, wherein the first product stream pathway is located between the second product stream pathway and the central axis of rotation, wherein the at least one discrete, flow interference member protrudes toward the first radially extending surface, and wherein the at least one discrete, flow interference member has an end adjacent to the first radially extending surface and forms a gap between the end and the first radially extending surface.

2. The centrifuge of claim 1, wherein the second product stream pathway is adjacent to the interior surface of the bowl portion.

3. The centrifuge of claim 1, wherein the first radially extending surface comprises at least one discrete, flow interference member that is located in the second product stream pathway to disrupt the flow of a second product stream wherein the at least one discrete, flow interference member protrudes toward the second radially extending surface, wherein the at least one discrete, flow interference member has an end adjacent to the second radially extending surface and forms a gap between the end and the second radially extending surface, wherein the gap is from greater than 0 mm to 10 mm.

4. The centrifuge of claim 1, wherein the at least one discrete, flow interference member is integrally formed on the second radially extending surface or is attached to the second radially extending surface with a fastener.

5. The centrifuge of claim 1, wherein the gap is from greater than 0 mm to 10 mm.

6. The centrifuge of claim 1, further comprising a plurality of disks positioned in the interior space of the bowl portion, wherein each disk has an outer diameter and a central opening having an inside diameter, wherein each disk is adjacent to and spaced apart from at least one other disk in a stacked manner to form a gap between adjacent disks, wherein the gap between adjacent disks defines a liquid fraction flowpath so that liquid fraction can flow toward the inner diameter, wherein each liquid fraction flowpath is in fluid communication with the first product stream pathway.

7. The centrifuge of claim 6, further comprising a separating disk positioned between an outermost disk of the plurality of disks, and the interior surface of the bowl portion, wherein the first radially extending surface comprises the interior surface of the bowl portion and the second radially extending surface comprises the surface of the separating disk adjacent to the interior surface of the bowl portion.

8. The centrifuge of claim 7, wherein a perpendicular distance between the interior surface of the bowl portion and the surface of the separating disk adjacent to the interior surface of the bowl portion is equal to or greater than a shortest perpendicular distance between any adjacent disks.

9. The centrifuge of claim 1, wherein the first radially extending surface comprises at least a sidewall portion and the second radially extending surface comprises at least a region, wherein the sidewall portion and the region define the inlet of the second product stream pathway, and wherein at least the sidewall portion and/or the region comprise the at least one discrete, flow interference member that is located in the second product stream pathway.

10. The centrifuge of claim 9, wherein sidewall portion is a first sidewall portion and the region is a first region, wherein the first radially extending surface further comprises at least a second sidewall portion and the second radially extending surface further comprises at least a second region, and further comprising one or more discrete, flow interference members located on the second sidewall portion and/or the second region and in the second product stream pathway.

11. The centrifuge of claim 10, wherein the first region comprises a first surface facing the first sidewall portion and second surface that is opposite the first surface, and further comprising one or more discrete, flow interference members located on the second surface.

12. The centrifuge of claim 1, further comprising a feed stream tube located along a central axis of the centrifuge to define a feed stream flow path, wherein the feed tube has an inlet and an outlet.

13. The centrifuge of claim 1, further comprising one or more radially extending structural spacer ribs between the first radially extending surface and the second radially extending surface.

14. The centrifuge of claim 13, wherein adjacent structural spacer ribs define a portion of the second product stream pathway.

15. The centrifuge of claim 1, wherein the bowl portion comprises a bowl bottom and a bowl top, and wherein an interior surface of the bowl bottom comprises at least one discrete, flow interference member to disrupt the flow along the bowl bottom interior surface.

16. The centrifuge of claim 1, further comprising a third product stream pathway, wherein the third product stream pathway is located between the second product stream pathway and the first product stream pathway.

17. The centrifuge of claim 1, wherein the second radially extending surface comprises the interior surface of the bowl portion.

18. The centrifuge of claim 1, further comprising a separating disk positioned in the interior space of the bowl portion, wherein the first radially extending surface comprises the interior surface of the bowl portion and the second radially extending surface comprises a surface of the separating disk that is opposite to the interior surface of the bowl portion.

19. The centrifuge of claim 1, wherein the at least one discrete, flow interference member comprises from 2 to 600 discrete, flow interference members.

20. The centrifuge of claim 1, wherein the at least one discrete, flow interference member comprises from 4 to 600 discrete, flow interference members.

21. The centrifuge of claim 1, wherein the at least one discrete, flow interference member comprises from 20 to 600 discrete, flow interference members.

22. A centrifuge having a central axis of rotation, wherein the centrifuge comprises:
- a) a bowl portion comprising:
  - i) at least one feed stream inlet and at least a first product stream outlet and a second product stream outlet;
  - ii) an interior surface that defines an interior space, wherein the at least one feed stream inlet and the at least two product stream outlets are in fluid communication with the interior space;
- b) a feed stream pathway in fluid communication with the at least one feed stream inlet and the interior space of the bowl portion; and
- c) two or more product stream pathways, wherein the two or more product stream pathways comprise at least:
  - i) a first product stream pathway; and
  - ii) a second product stream pathway wherein the second product stream pathway has an inlet in the interior space, wherein the second product stream pathway comprises a space between a first radially extending surface and a second radially extending surface, wherein the inlet is adjacent to the interior surface of the bowl portion and permits fluid flow from the interior space into the second product stream pathway, wherein at least the second radially extending surface comprises at least one discrete, flow interference member that is located in the second product stream pathway to disrupt the flow of a second product stream, wherein the first product stream pathway is located between the second product stream pathway and the central axis of rotation, wherein the at least one discrete, flow interference member protrudes toward and does not contact the first radially extending surface.

23. The centrifuge of claim 22, wherein the first radially extending surface-comprises at least one discrete, flow interference member that is located in the second product stream pathway to disrupt the flow of a second product stream wherein the at least one discrete, flow interference member protrudes toward and does not contact the second radially extending surface.

24. The centrifuge of claim 22, wherein the second radially extending surface comprises the interior surface of the bowl portion.

25. The centrifuge of claim 22, further comprising a separating disk positioned in the interior space of the bowl portion, wherein the first radially extending surface comprises the interior surface of the bowl portion and the second radially extending surface comprises a surface of the separating disk that is opposite to the interior surface of the bowl portion.

26. The centrifuge of claim 22, further comprising a plurality of disks positioned in the interior space of the bowl portion, wherein each disk has the outer diameter and the central opening having the inside diameter, wherein each disk is adjacent to and spaced apart from at least one other disk in a stacked manner to form a gap between adjacent disks, wherein the gap between adjacent disks defines a liquid fraction flowpath so that liquid fraction can flow toward the inner diameter, wherein each liquid fraction flowpath is in fluid communication with the first product stream pathway.

27. The centrifuge of claim 22, wherein the at least one discrete, flow interference member comprises from 4 to 600 discrete, flow interference members.

28. A centrifuge having a central axis of rotation, wherein the centrifuge comprises:
- a) a bowl portion comprising:
  - i) at least one feed stream inlet and at least a first product stream outlet and a second product stream outlet;
  - ii) an interior surface that defines an interior space, wherein the at least one feed stream inlet and the at least two product stream outlets are in fluid communication with the interior space;
- b) a feed stream pathway in fluid communication with the at least one feed stream inlet and the interior space of the bowl portion; and
- c) two or more product stream pathways, wherein the two or more product stream pathways comprise at least:
  - i) a first product stream pathway; and
  - ii) a second product stream pathway wherein the second product stream pathway has an inlet in the interior space, wherein the second product stream pathway comprises a space between a first radially extending surface and a second radially extending surface, wherein the inlet is adjacent to the interior surface of the bowl portion and permits fluid flow from the interior space into the second product stream pathway, wherein the first product stream pathway is located between the second product stream pathway and the central axis of rotation, and wherein the bowl portion comprises a bowl bottom and a bowl top, wherein the bowl bottom has a sidewall portion, and wherein an interior surface of the sidewall portion comprises at least one discrete, flow interference member to disrupt the flow along the interior surface of the sidewall portion.

29. A centrifuge having a central axis of rotation, wherein the centrifuge comprises:

a) a bowl portion comprising:

i) at least one feed stream inlet and at least a first product stream outlet and a second product stream outlet;

ii) an interior surface that defines an interior space, wherein the at least one feed stream inlet and the at least two product stream outlets are in fluid communication with the interior space;

b) a feed stream pathway in fluid communication with the at least one feed stream inlet and the interior space of the bowl portion; and c) two or more product stream pathways, wherein the two or more product stream pathways comprise at least:

i) a first product stream pathway; and ii) a second product stream pathway wherein the second product stream pathway has an inlet in the interior space, wherein the second product stream pathway comprises a space between a first radially extending surface and a second radially extending surface, wherein the inlet is adjacent to the interior surface of the bowl portion and permits fluid flow from the interior space into the second product stream pathway, wherein at least the second radially extending surface comprises at least one discrete, flow interference member that is located in the second product stream pathway to disrupt the flow of a second product stream, wherein the first product stream pathway is located between the second product stream pathway and the central axis of rotation; and d) a plurality of radially extending structural spacer ribs between and in contact with the first radially extending surface and the second radially extending surface, wherein adjacent structural spacer ribs define a portion of the second product stream pathway, and wherein the at least one discrete, flow interference member is positioned between adjacent structural spacer ribs.

30. The centrifuge of claim 29, wherein the at least one discrete, flow interference member comprises from 4 to 600 discrete, flow interference members.

31. The centrifuge of claim 29, wherein the plurality of radially extending structural spacer ribs comprises at least two radially extending structural spacer ribs, and wherein the at least one discrete, flow interference member is positioned between adjacent structural spacer ribs.

32. The centrifuge of claim 29, wherein the plurality of radially extending structural spacer ribs comprises eight radially extending structural spacer ribs.

33. The centrifuge of claim 29, wherein the at least one discrete, flow interference member positioned between adjacent structural spacer ribs comprises 3 or more discrete, flow interference member positioned between adjacent structural spacer ribs.

34. The centrifuge of claim 29, wherein the second radially extending surface comprises the interior surface of the bowl portion.

35. The centrifuge of claim 29, further comprising a separating disk positioned in the interior space of the bowl portion, wherein the first radially extending surface comprises the interior surface of the bowl portion and the second radially extending surface comprises a surface of the separating disk that is opposite to the interior surface of the bowl portion.

36. The centrifuge of claim 29, further comprising a plurality of disks positioned in the interior space of the bowl portion, wherein each disk has the outer diameter and the central opening having the inside diameter, wherein each disk is adjacent to and spaced apart from at least one other disk in a stacked manner to form a gap between adjacent disks, wherein the gap between adjacent disks defines a liquid fraction flowpath so that liquid fraction can flow toward the inner diameter, wherein each liquid fraction flowpath is in fluid communication with the first product stream pathway.

37. A centrifuge having a central axis of rotation, wherein the centrifuge comprises:

a) a bowl portion comprising:

i) at least one feed stream inlet and at least a first product stream outlet and a second product stream outlet;

ii) an interior surface that defines an interior space, wherein the at least one feed stream inlet and the at least two product stream outlets are in fluid communication with the interior space;

b) a feed stream pathway in fluid communication with the at least one feed stream inlet and the interior space of the bowl portion; and c) two or more product stream pathways, wherein the two or more product stream pathways comprise at least:

i) a first product stream pathway; and ii) a second product stream pathway wherein the second product stream pathway has an inlet in the interior space, wherein the second product stream pathway comprises a space between a first radially extending surface and a second radially extending surface, wherein the inlet is adjacent to the interior surface of the bowl portion and permits fluid flow from the interior space into the second product stream pathway, and wherein the first product stream pathway is located between the second product stream pathway and the central axis of rotation; and d) a plurality of discrete, flow interference members that are located in the second product stream pathway to disrupt the flow of a second product stream, wherein at least one of the plurality of discrete, flow interference members is offset circumferentially and offset radially in the second product stream pathway with respect to at least one other of the plurality of discrete, flow interference members, wherein at least the second radially extending surface comprises the plurality of discrete, flow interference members.

38. The centrifuge of claim 37, further comprising a separating disk positioned in the interior space of the bowl portion, wherein the first radially extending surface comprises the interior surface of the bowl portion and the second radially extending surface comprises a surface of the separating disk that is opposite to the interior surface of the bowl portion.

39. The centrifuge of claim 37, further comprising a plurality of disks positioned in the interior space of the bowl portion, wherein each disk has the outer diameter and the central opening having the inside diameter, wherein each disk is adjacent to and spaced apart from at least one other disk in a stacked manner to form a gap between adjacent disks, wherein the gap between adjacent disks defines a liquid fraction flowpath so that liquid fraction can flow toward the inner diameter, wherein each liquid fraction flowpath is in fluid communication with the first product stream pathway.

40. The centrifuge of claim 37, wherein the plurality of discrete, flow interference members comprises from 4 to 600 discrete, flow interference members.

* * * * *